(12) United States Patent
Taneja

(10) Patent No.: US 10,904,267 B2
(45) Date of Patent: Jan. 26, 2021

(54) NON-INTRUSIVE THREAT DETECTION IN A COMPUTER NETWORK

(71) Applicant: salesforce.com, inc., San Francisco, CA (US)

(72) Inventor: Vikas Taneja, Redmond, WA (US)

(73) Assignee: salesforce.com, inc., San Francisco, CA (US)

( * ) Notice: Subject to any disclaimer, the term of this patent is extended or adjusted under 35 U.S.C. 154(b) by 150 days.

(21) Appl. No.: 15/423,623

(22) Filed: Feb. 3, 2017

(65) Prior Publication Data

US 2018/0227315 A1    Aug. 9, 2018

(51) Int. Cl.
*H04L 29/06* (2006.01)

(52) U.S. Cl.
CPC ................. *H04L 63/1408* (2013.01)

(58) Field of Classification Search
CPC .............. H04L 63/1408; G06F 17/30864
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz | |
| 5,649,104 A | 7/1997 | Carleton | |
| 5,715,450 A | 2/1998 | Ambrose et al. | |
| 5,761,419 A | 6/1998 | Schwartz | |
| 5,819,038 A | 10/1998 | Carleton | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |

(Continued)

OTHER PUBLICATIONS

U.S. Appl. No. 13/986,251, filed Apr. 16, 2013.

*Primary Examiner* — Carl G Colin
*Assistant Examiner* — Han Yang
(74) *Attorney, Agent, or Firm* — Dergosits & Noah LLP; Todd A. Noah

(57) ABSTRACT

The system identifies a data transmission path between a source node and a destination node in a computer network during a communication session. The transmission path includes one or more intermediary nodes used to transmit data from the source node to the destination node. The system identifies if the identified transmission path is one of a plurality of trusted transmission paths stored in a trusted transmission path table. When the identified transmission path is not one of the plurality of trusted transmission paths, the system generates a notification, which may include an instruction to terminate the communication session, a list comprising at least one of the plurality of trusted transmission paths and an instruction to transmit data using the at least one of the plurality of trusted transmission paths in the list, or an instruction to alert a customer that the at least one transmission path is not trusted.

22 Claims, 16 Drawing Sheets

(56) References Cited

U.S. PATENT DOCUMENTS

| | | |
|---|---|---|
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,620,655 B2 | 11/2009 | Larsson |
| 7,698,160 B2 | 4/2010 | Beaven et al. |
| 7,779,475 B2 | 8/2010 | Jakobson et al. |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,209,308 B2 | 6/2012 | Jakobson et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2007/0076600 A1* | 4/2007 | Ekl .................. H04L 45/308 370/229 |
| 2007/0156900 A1* | 7/2007 | Chien ................ G06F 21/645 709/225 |
| 2007/0180495 A1* | 8/2007 | Hardjono ............ H04L 63/0823 726/3 |
| 2007/0195702 A1* | 8/2007 | Yuen .................. H04L 45/121 370/238 |
| 2008/0172366 A1* | 7/2008 | Hannel ............... H04L 63/0272 |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2012/0233137 A1 | 9/2012 | Jakobson et al. |
| 2013/0218948 A1 | 8/2013 | Jakobson |
| 2013/0218949 A1 | 8/2013 | Jakobson |
| 2013/0218966 A1 | 8/2013 | Jakobson |
| 2014/0359537 A1 | 12/2014 | Jakobson et al. |
| 2015/0007050 A1 | 1/2015 | Jakobson et al. |
| 2015/0095162 A1 | 4/2015 | Jakobson et al. |
| 2015/0172563 A1 | 6/2015 | Jakobson et al. |
| 2015/0365427 A1* | 12/2015 | Ben-Shalom ........ G06F 21/55 726/23 |
| 2016/0359724 A1* | 12/2016 | Bent .................. G06F 17/30566 |
| 2017/0237738 A1* | 8/2017 | Lee .................... H04L 63/10 726/4 |

* cited by examiner

| TRUSTED PATH TABLE | | |
|---|---|---|
| PATH 1 | PATH 2 | PATH 3 |
| Source | Source | Source |
| Node 1 | Node 2 | Node 3 |
| Node 4 | Destination | Node 5 |
| Destination | | Destination |

FIG. 4A

| | PATH 1 | PATH 2 | PATH 3 | PATH 4 | PATH 5 | PATH 6 | PATH 7 | PATH 8 | PATH 9 |
|---|---|---|---|---|---|---|---|---|---|
| | Source | Source | Source | Source | Source | Source | Source | Source | Source |
| | Node 1 | Node 2 | Node 3 | Node 1 | Node 2 | Node 2 | Node 3 | Node 2 | Node 2 |
| | Node 4 | Destination | Node 5 | Node 5 | Node 1 | Node 3 | Node 4 | Node 4 | Node 5 |
| | Destination | | Destination | Destination | Node 4 | Node 5 | Destination | Destination | Destination |
| | | | | | Destination | Destination | | | |

TRUSTED PATH TABLE

FIG. 4B

NON-INTRUSIVE THREAT DETECTION IN A COMPUTER NETWORK

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to threat detection in a computer network.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

The following detailed description is made with reference to the technology disclosed. Preferred implementations are described to illustrate the technology disclosed, not to limit its scope, which is defined by the claims. Those of ordinary skill in the art will recognize a variety of equivalent variations on the description.

This invention relates to the field of network analysis, and in particular to a system and method that facilitates non-intrusive threat detection of malicious data by analyzing potential multi-hop data transmission paths from a source node to a destination node.

Network routing is vulnerable to disruptions caused by malfunctioning or malicious routers that draw traffic towards themselves and either add malicious code to the data or fail to correctly forward the traffic. The existing approach to addressing this problem is to secure the routing protocol by having a source node validate the transmission of the data to the destination node. Validating the transmission of data may entail verifying the transmitted data's authenticity, accuracy, and/or consistency. For example, browser fingerprinting may be used to verify that data received from the source node, such as a client device, is authentic.

In the existing approaches, information or action is required from the source node, such as a client device. For example, the source node must provide browser fingerprinting information to the destination node for the purpose of identification. Security measures that require a source node to provide information or perform an actions to verify the authenticity, accuracy and/or consistency of transmitted data is a burden on source node. Furthermore, these security measures are also susceptible to threats since hackers can intercept and change the source node information in such a way that it appears to be legitimate yet includes malicious code.

A system is needed where the robustness of transmission paths are scrutinized. To this end, we propose a different approach, the central idea of which is a non-intrusive threat detection protocol that enables source nodes to detect and locate potential routing (arbitrarily severe) misbehaviors, so that appropriate action can be taken.

BRIEF DESCRIPTION OF THE DRAWINGS

In the following drawings like reference numbers are used to refer to like elements. Although the following figures depict various examples, the one or more implementations are not limited to the examples depicted in the figures. Further, features illustrated in multiple figures are referenced by the same reference numerals.

FIG. 4A illustrates an example of a trusted path table created in response to a trace-route operation from source node to destination node in the example network shown in FIG. 3A;

FIG. 4B illustrates another example of a trusted path table created in response to a trace-route operation from source node to destination node in the example network shown in FIG. 3B

DETAILED DESCRIPTION

Figure 1:
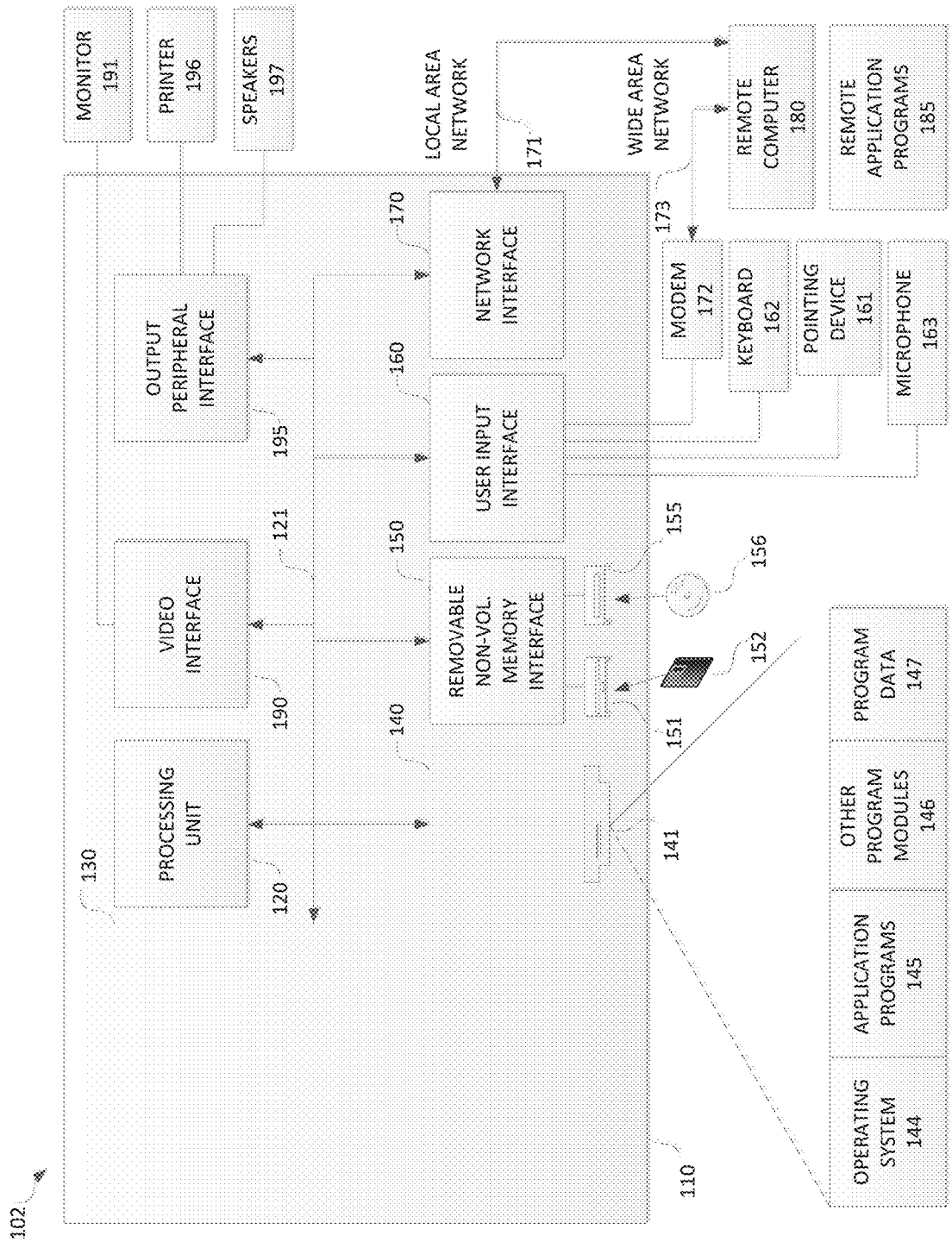
FIG. 1 is a diagram of an example computing system that may be used with some embodiments.

Systems and methods are provided for identifying a set of trusted data transmission paths for transmitting data from a source node to a destination node, and using the set of identified trusted data transmission paths to determine if new data transmission paths are untrusted. If the new data transmission paths are untrusted, a notification may be sent to the source node indicating the paths are untrusted and may include potential threats. In one embodiment, the system may also provide the source node alternative trusted data transmission paths that can be used to transmit data. Data from route determination operations such as trace route operations, PathPing operations or the like are used to identify the potential transmission paths data may take while being transmitted by a source node to a destination node via intermediary nodes. The terms "route" and "path" may be interchangeable and define or indicate the sequence of intermediary nodes used to transmit data from the source device to the destination device.

The systems and methods will be described with reference to example embodiments. These examples are being provided solely to add context and aid in the understanding of the present disclosure. It will thus be apparent to one skilled in the art that the techniques described herein may be practiced without some or all of these specific details. In other instances, well known process steps have not been described in detail in order to avoid unnecessarily obscuring the present disclosure. Other applications are possible, such that the following examples should not be taken as definitive or limiting either in scope or setting.

In the following detailed description, references are made to the accompanying drawings, which form a part of the description and in which are shown, by way of illustration, specific embodiments. Although these embodiments are described in sufficient detail to enable one skilled in the art to practice the disclosure, it is understood that these examples are not limiting, such that other embodiments may be used and changes may be made without departing from the spirit and scope of the disclosure.

As used herein, the term "multi-tenant database system" refers to those systems in which various elements of hardware and software of the database system may be shared by one or more customers. For example, a given application server may simultaneously process requests for a great number of customers, and a given database table may store rows for a potentially much greater number of customers.

The described subject matter may be implemented in the context of any computer-implemented system, such as a software-based system, a database system, a multi-tenant environment, or the like. Moreover, the described subject matter may be implemented in connection with two or more separate and distinct computer-implemented systems that cooperate and communicate with one another. One or more embodiments may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

As used herein, the term the 'traceroute' operation is a common utility on most computer operating systems. In the Microsoft Windows operating system, the command "tracert <destination address>" will return a "trace" of the path that an internally generated message takes as it travels to the destination. Typically, the time associated with the sending of three such messages are reported for each 'hop' along the path, a 'hop' being defined as a connection/link between two network level devices, typically each intermediary node, such as a router, between the source and destination nodes. It is generally assumed that the output from a 'trace-route' operation indicates the actual path that each of 'the three generated messages' traveled as they progressed from the source to the destination.

As used herein, the PathPing operation is another route tracing tool that combines features of pinging and traceroute with additional information that neither of those tools provides. PathPing sends packets to each router on the way to a final destination over a period of time, and then computes results based on the packets returned from each hop. Since PathPing shows the degree of packet loss at any given router or link, the information returned in response to the PathPing operation can pinpoint which routers or links used to transmit the packet from source to destination.

While one or more implementations and techniques are described with reference to an embodiment in which intrusion detection may be implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

The described subject matter may be implemented in the context of any computer-implemented system, such as a software-based system, a database system, a multi-tenant environment, or the like. Moreover, the described subject matter may be implemented in connection with two or more separate and distinct computer-implemented systems that cooperate and communicate with one another. One or more implementations may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

FIG. 1 is a diagram of an example client computing system or node that may be used with some embodiments of the invention. The computing system 102 may be used by a user to log into a computer network to transmit data.

The computing system 102 is only one example of a suitable computing system, such as a mobile computing system, and is not intended to suggest any limitation as to the scope of use or functionality of the design. Neither should the computing system 102 be interpreted as having any dependency or requirement relating to any one or combination of components illustrated. The design is operational with numerous other general purpose or special purpose computing systems. Examples of well-known computing systems, environments, and/or configurations that may be suitable for use with the design include, but are not limited to, personal computers, server computers, hand-held or laptop devices, multiprocessor systems, microprocessor-based systems, set top boxes, programmable consumer electronics, mini-computers, mainframe computers, distributed computing environments that include any of the above systems or devices, and the like. For example, the computing system 102 may be implemented as a mobile computing system such as one that is configured to run with an operating system (e.g., iOS) developed by Apple Inc. of Cupertino, Calif. or an operating system (e.g., Android) that is developed by Google Inc. of Mountain View, Calif.

Some embodiments of the present invention may be described in the general context of computing system executable instructions, such as program modules, being executed by a computer. Generally, program modules include routines, programs, objects, components, data structures, etc. that performs particular tasks or implement particular abstract data types. Those skilled in the art can implement the description and/or figures herein as computer-executable instructions, which can be embodied on any form of computing machine program product discussed below.

Some embodiments of the present invention may also be practiced in distributed computing environments where tasks are performed by remote processing devices that are linked through a communications network. In a distributed computing environment, program modules may be located in both local and remote computer storage media including memory storage devices.

Referring to FIG. 1, the computing system 102 may include, but are not limited to, a processing unit 120 having one or more processing cores, a system memory 130, and a system bus 121 that couples various system components including the system memory 130 to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) locale bus, and Peripheral Component Interconnect (PCI) bus also known as Mezzanine bus.

The computing system 102 typically includes a variety of computer program product. Computer program product can be any available media that can be accessed by computing system 102 and includes both volatile and nonvolatile media, removable and non-removable media. By way of example, and not limitation, computer program product may store information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing system 102. Communication media typically embodies computer readable instructions, data structures, or program modules.

The system memory 130 may include computer storage media in the form of volatile and/or nonvolatile memory such as read only memory (ROM) 131 and random access memory (RAM) 132. A basic input/output system (BIOS) 133, containing the basic routines that help to transfer information between elements within computing system 102, such as during start-up, is typically stored in ROM 131. RAM 132 typically contains data and/or program modules that are immediately accessible to and/or presently being operated on by processing unit 120. By way of example, and not limitation, FIG. 1 also illustrates operating system 134, application programs 135, other program modules 136, and program data 137.

The computing system 102 may also include other removable/non-removable volatile/nonvolatile computer storage media. By way of example only, FIG. 1 also illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as, for example, a CD ROM or other optical media. Other removable/non-removable, volatile/nonvolatile computer storage media that can be used in the exemplary operating environment include, but are not limited to, USB drives and devices, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computing system 102. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. The operating system 144, the application programs 145, the other program modules 146, and the program data 147 are given different numeric identification here to illustrate that, at a minimum, they are different copies.

A user may enter commands and information into the computing system 102 through input devices such as a keyboard 162, a microphone 163, and a pointing device 161, such as a mouse, trackball or touch pad or touch screen. Other input devices (not shown) may include a joystick, game pad, scanner, or the like. These and other input devices are often connected to the processing unit 120 through a user input interface 160 that is coupled with the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computing system 102 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computing system 102. The logical connections depicted in FIG. 1 includes a local area network (LAN) 171 and a wide area network (WAN) 173, but may also include other networks. Such networking environments are commonplace in offices, enterprise-wide computer networks, intranets and the Internet.

When used in a LAN networking environment, the computing system 102 may be connected to the LAN 171 through a network interface or adapter 170. When used in a WAN networking environment, the computing system 102 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computing system 102, or portions thereof, may be stored in a remote memory storage device. By way of example, and not limitation, FIG. 1 illustrates remote application programs 185 as residing on remote computer 180. It will be appreciated that the network connections shown are exemplary and other means of establishing a communications link between the computers may be used.

It should be noted that some embodiments of the present invention may be carried out on a computing system such as that described with respect to FIG. 1. However, some embodiments of the present invention may be carried out on a server, a computer devoted to message handling, handheld devices, or on a distributed system in which different portions of the present design may be carried out on different parts of the distributed computing system.

Another device that may be coupled with the system bus 121 is a power supply such as a battery or a Direct Current (DC) power supply) and Alternating Current (AC) adapter circuit. The DC power supply may be a battery, a fuel cell, or similar DC power source needs to be recharged on a periodic basis. The communication module (or modem) 172 may employ a Wireless Application Protocol (WAP) to establish a wireless communication channel. The communication module 172 may implement a wireless networking standard such as Institute of Electrical and Electronics Engineers (IEEE) 802.11 standard, IEEE std. 802.11-1999, published by IEEE in 1999.

Examples of mobile computing systems may be a laptop computer, a tablet computer, a Netbook, a smart phone, a personal digital assistant, or other similar device with on board processing power and wireless communications ability that is powered by a Direct Current (DC) power source that supplies DC voltage to the mobile computing system and that is solely within the mobile computing system and needs to be recharged on a periodic basis, such as a fuel cell or a battery.

Figure 2:
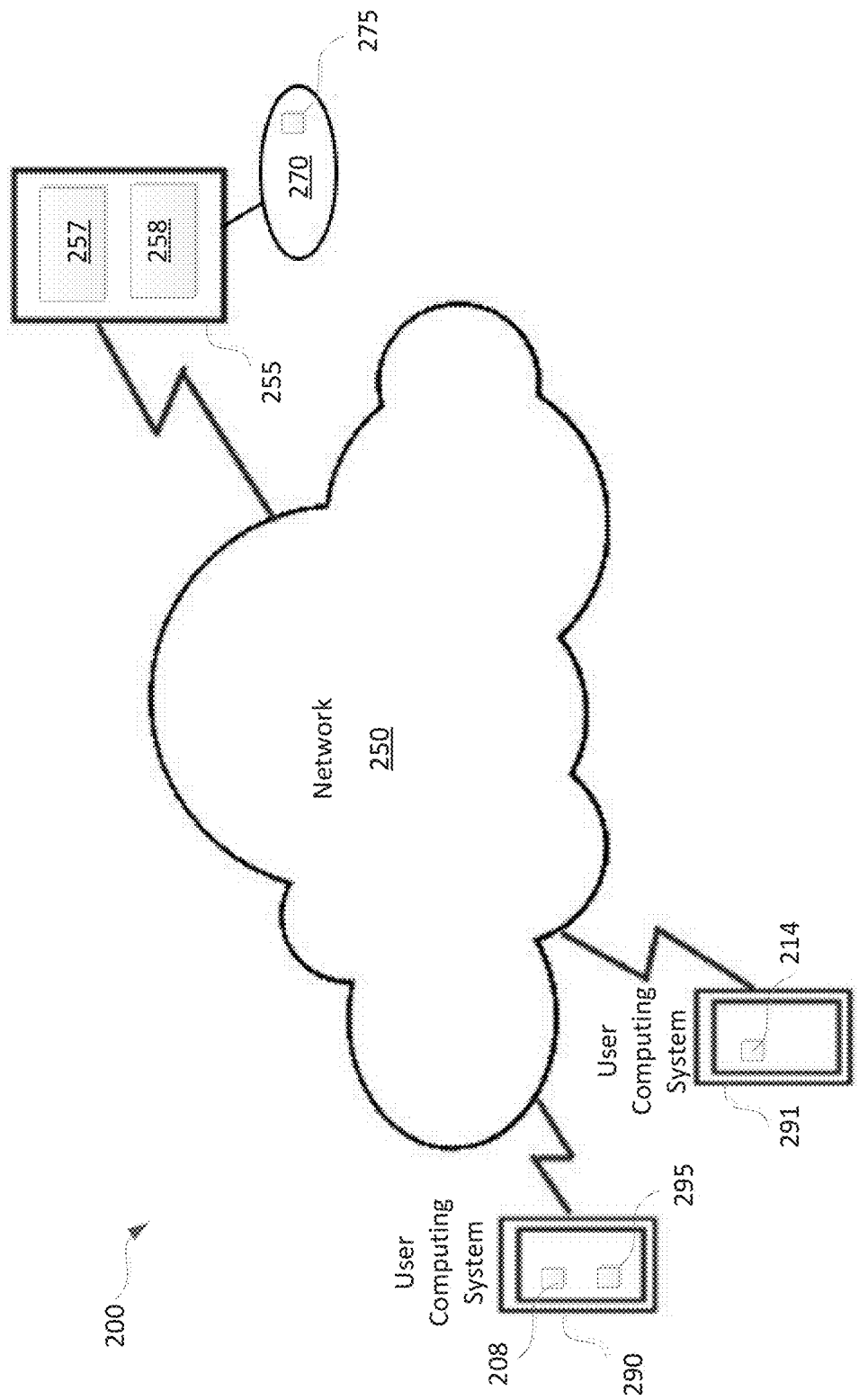
FIG. 2 is a diagram of an example network environment that may be used with some embodiments.

FIG. 2 shows a diagram of an example network environment that may be used with some embodiments of the invention. Network environment 200 may include client computing systems 290 and 291. One or more of the computing systems 290 and 291 may be a mobile computing system. The computing systems 290 and 291 may be connected to the network 250 via a cellular connection or via a Wi-Fi router (not shown). The network 250 may be the Internet. The computing systems 290 and 291 may be coupled with server computing system 255 via the network 250.

Each of the computing systems 290 and 291 may include a respective application module 208 and 214. A developer may use the computing system 290 and the application module 208 to communicate with the server computing system 255 and log into application 257 (e.g., a Salesforce-.com® application).

The server computing system 255 may be coupled with database 270. The database 270 may be configured to include a central repository 275 which may store the source code and the binary code associated with the application 258. For example, the developer may log into the application 257 to start using the resources of the server computing system 255, including accessing the central repository 275. The central repository 275 may be shared by multiple developers to collaborate development activities relating to the application 258. A developer may use the local repository 295 to store source code and binary code for testing in a local work space.

Figure 3A:
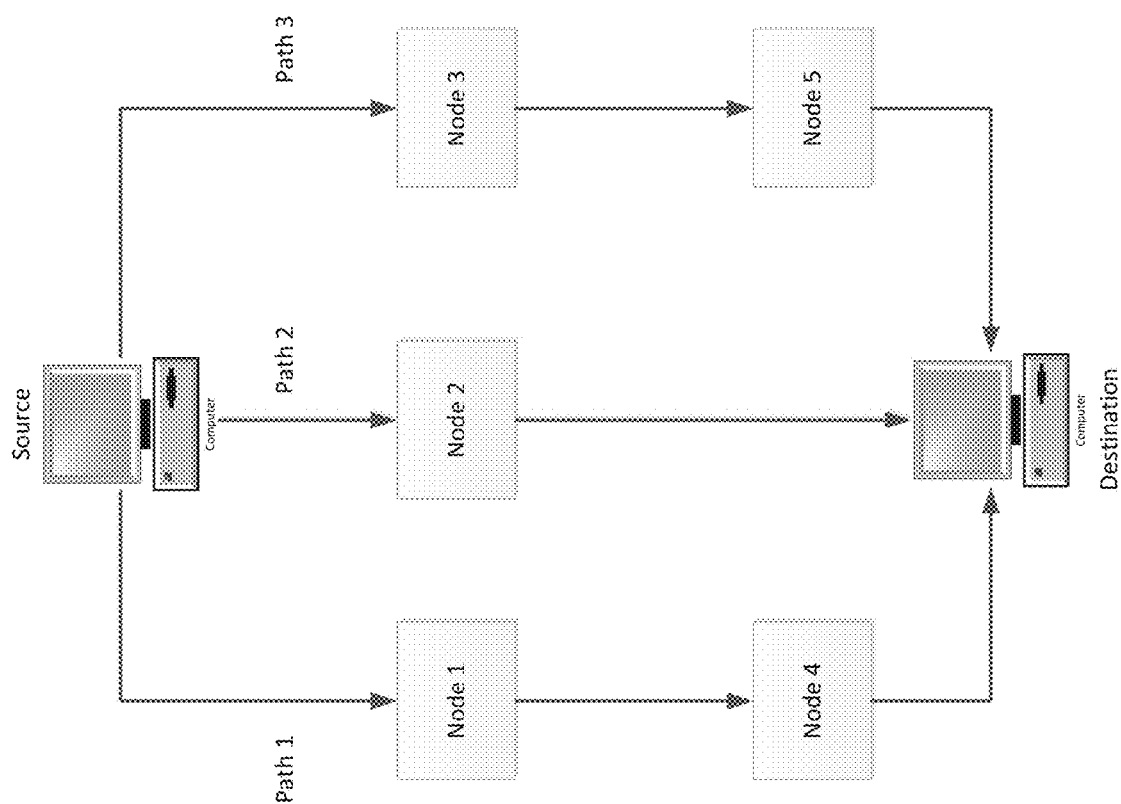
FIG. 3A is an example network having multiple paths between source node and destination node.

FIG. 3A illustrates an example network having multiple paths between source node and destination node. In computer networking, data packets pass through bridges, routers, gateways and the like as they travel between source and destination. For example, a data packet from a source node might be transmitted to the destination node via node 1 and node 4. Alternatively, the data packet may be transmitted from the source node to the destination node via node 3 and node 5 or via node 2. The source node may initiate a route determination operation, such as a traceroute operation or a PathPing operation, prior to sending the data packet to the destination node to determine the optimal route or fastest route to the destination node or to identify potential misbehaviors within the potential routes. The source node may send out multiple requests for multiple route determination operations to be performed in parallel. The set of routes that are determined via the multiple route determination operations may indicate the network topology. A trace route operation is a computer network diagnostic tool for displaying the route of packets across an IP network.

In one embodiment, a source node may request a route determination operation or parallel route determination operations be performed at predetermined intervals. For example, prior to transmitting data to a destination node or when the communication session is established between a source node and a destination node, the source node may request an initial route determination operation or parallel multiple route determination operations. The set of paths resulting from the initial route determination operations are considered initially trusted paths. Thereinafter, the source node may initiate route determination operations during predetermined intervals, such as every 5 seconds, 10 seconds, 1 minute, and the like. For example, after the initial route determination operation, the source node may request a second route determination operation after 20 seconds, a third route determination operation after 40 seconds, a fourth route determination operation after 60 seconds, and so forth. FIG. 4A illustrates an example of a table storing paths that were a result of three initial parallel route determination operations from the source node to the destination node from the network path diagram shown in FIG. 3A. A route determination operation may send out messages from the source node to the destination node to discover a path that is available for transmitting the data packets. Multiple route determination operations may send out multiple messages in parallel or in a timed sequence to determine different paths from the source node to the destination node.

In one embodiment, when a communication session between a source node and a destination node is initiated, an initial route determination operation or operations that are performed in parallel will return at least one initial path. The at least one initial path will automatically be considered trusted. These initial trusted paths are used to generate or added to a trusted path table associated with source node and destination node, as illustrated in FIG. 4A.

The trusted path table shown in FIG. 4A illustrates a trusted path table created in response to an initial trace-route operations from a source node to a destination node in a network embodiment shown in FIG. 3A and includes columns that represent each route from source to destination discovered by a route determination operation. Since the paths, Paths 1-3, were discovered through the initial route determination operation, the paths are automatically determined to be trusted.

In this example shown in FIGS. 3A and 4A, the three trace route operations have been requested and are being processed. The first trace route operation returns: a first message from node 1; a second message from node 4; and a third message is returned from the destination node. This first trace route operation returns Path 1 which comprises node 1 and node 4. The second trace route operation returns: a first message from node 2 and a second message from the destination node. This second trace route operation returns Path 2 which comprises node 2. The third trace route operation returns: a first message from node 3; a second message from node 5; and a third message from the destination node. The third trace route operation returns Path 3 which comprises node 3 and node 5.

It should be noted that each trace route operation will always have information regarding the nodes that the messages have been transmitted to, and one of skill in the art will certainly be able to provide a trace-route operation or a similar route determination operation that includes the details associated with each returned message at each hop. For example, a each message returned during the first trace route operation may include a round trip time that may indicate the time it would take for data to be transmitted.

The initial set of paths generated from the initial route determination operation may be designated as trusted in the path table. Thereafter, the source node may initiate a route determination operation on periodic bases or on demand. For example, the source may initiate a route determination operation every 10 seconds, every minute, every 5 minutes, or the like. As more paths are discovered, via the subsequent route determination operations or the use of combinations of the different intermediary nodes, the path table can be automatically updated.

Each path discovered by a subsequent route determination operation may be analyzed to determine if the path is a trusted. For example, after the initial route determination operation, a second route determination operation is performed after a predetermined amount of time. Each discovered path from the second route determination operation may be analyzed by comparing each discovered path with the trusted paths stored in the trusted path table. If the discovered path is not an already determined trusted path stored in the table, a determination may be made if all the intermediary nodes in the discovered path are nodes that part of at least one path in the trusted path table. A discovered path, in which all intermediary nodes in that path are included in at least one determined trusted path, is considered a trusted path and added to the trusted path table. If all the intermediary nodes of a discovered path are not include in at least one already determined trusted path, then the path may be labeled as untrusted and stored in a log of potentially untrusted paths.

In one embodiment, if a path is discovered during a subsequent route determination operation and includes a new intermediary node that is not part of at least one path that has been designated as a trusted in the path table, the new intermediary node or the path comprising the new intermediary node may be stored in a log of untrusted nodes. The new intermediary node or the path comprising the new intermediary node may be given a designated trust level. When initially stored in the log, the new intermediary node or path may be designated or assigned a trust level of 0%.

When an intermediary node is designated as having an unknown trust level (e.g. trust level=0%), the controller may flag the node and monitor the node to determine if the node is malicious or faulty. The controller may generate a log of all the nodes or paths having an unknown or untrusted trust level. As time goes on and subsequent route determination operations return paths that include the untrusted/unknown nodes, the trust level of the untrusted or unknown nodes increases. In one embodiment, the log stores identification the unknown/untrusted nodes along with a trust level associated with the unknown/untrusted nodes. For example, after a first route determination operation node B may be identified as an unknown/untrusted node and stored in a log with and indication of a 0% trust level. After a second route determination operation, another path has been return that includes node B. Because node B was part of a path that was returned during a second route determination operation, the trust level of node B indicated in the log changes from 0% to 20%. After node B has been returned as part of a path in response to a third route determination operation, the trust level of node B increases to 40%. Once node B reaches a threshold level of trust, node B will become a trusted node and paths that include node B along with other trusted intermediary nodes are stored in the trusted path table. Both the percentage of increase of the trust level and the threshold level may be predetermined by administrator.

In another embodiment, once the route and paths are determined to be trusted, the intermediary nodes of each of the trusted paths may be saved in a trusted node table as trusted nodes. If a new intermediary node is returned as part of a subsequent path, the new intermediary node is compared to the nodes in the trusted node table. If the new intermediary node is not in the trusted node table, the new intermediary node is labeled as untrusted. The untrusted nodes may be saved in the same table as the trusted nodes and labeled as untrusted, or saved in a separate log of untrusted nodes. The log may indicate the trust level of each untrusted node.

In one embodiment, a source node that has had a data transmission failure through a specific path, has determined a node of a specific path may be malicious, or has found any other transmission defects with a specific path or a specific node may report the transmission defect to a controller. The controller may then search the current trusted path table to determine if any of the specific paths or nodes that are defective are listed in the trusted path table. If the defective paths or nodes are listed in the trusted path table, the controller may remove the defective path or node from the list, label the defective node or path as having a 0% trust level, warn other source nodes of the defective path or node, and/or add the defect node or path to the log comprising a list of untrusted paths/nodes.

Although the trusted path table is initially formed based on paths discovered through route determination operations, new trusted paths may be derived from forming combinations of intermediary nodes that were used in the different trusted paths in the trusted path table.

Figure 3B:
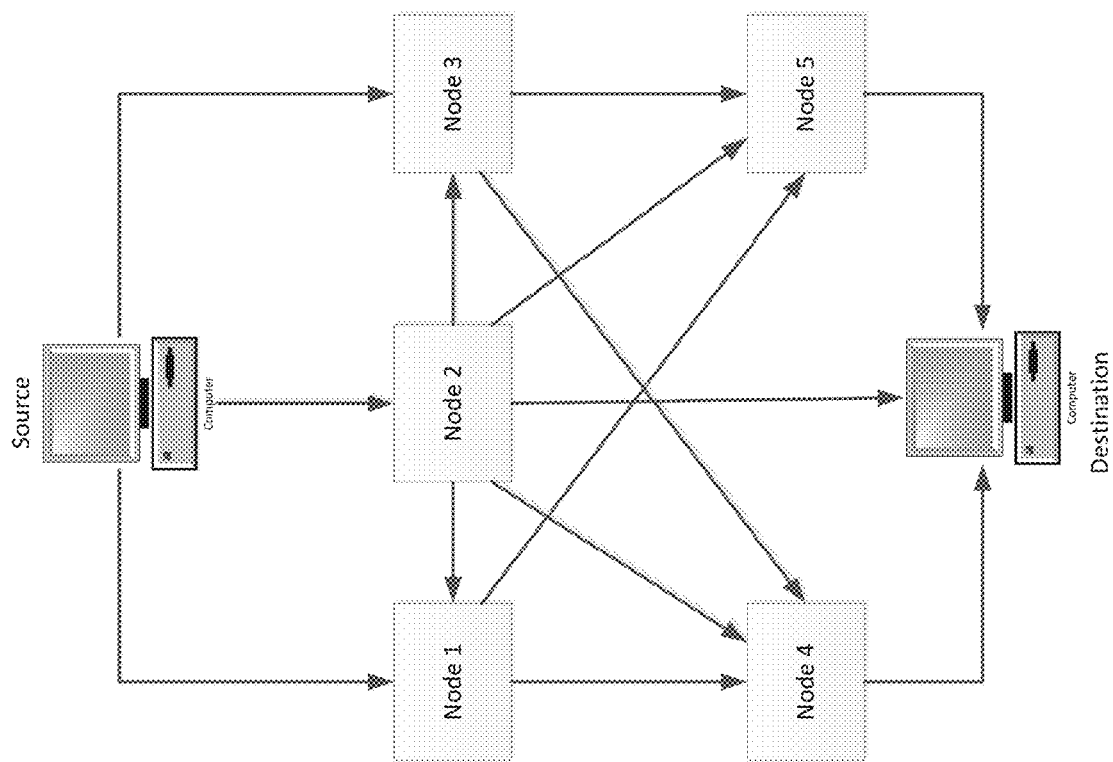
FIG. 3B illustrates an example network path diagram that could be deduced or derived based on the example result of a trace-route operation between the source node and the destination node illustrated in FIG. 3B.

For example, FIG. 3B illustrates an example network path diagram that could be deduced or derived based on the example result of a route determination operation between the source node and the destination node of the network illustrated in FIG. 3A. Path 1, Path 2 and Path 3 were all determined by different initial route determination operations and were considered trusted. Any combination of the intermediary nodes associated with Path 1, Path 2 and Path 3 can be used to derive trusted paths. For example, Path 4 and Path 5 listed in the trusted path table in FIG. 4B are paths derived from intermediary nodes that are part of other trusted paths. Path 4 was derived from combining nodes 1 from Path 1 and node 5 from Path 3. Similarly, Path 5 was derived from combining node 2 from Path 2, node 1 from Path 1, and node 4 from Path 1.

The paths derived from the paths discovered through the trace route operation may or may not exist, or could exist in the future. However, each of the nodes in the derived paths are node s that are included in one of the paths discovered by the trace route operation or that have been determined to be trusted paths. Therefore, the derived paths are considered trusted paths and will be added to the trusted path table.

In one embodiment, the paths discovered through the route determination operation and the potential paths derived from the discovered paths are subsequently assessed to determine which of the potential paths suggested by the route determination operation results are 'feasible', a feasible path being defined as one that is supported by ancillary information, such as routing tables, ARP tables, and/or other device configuration data. Additionally, the paths discovered through the route determination operation and the potential paths derived from the discovered paths may have to be approved prior to being labeled or noted as trusted paths. Additionally, the paths may have to be labeled or noted as approved before the paths are added to the trusted path table. In one embodiment, the approval is based on an approval algorithm that assesses each path or the paths may have to meet certain conditions to be approved.

In this embodiment, a single or a combination of multiple approval processes may be used to assess each path. If the path has been approved, conditions associated with the approval for each path may be defined for any transmission from the source node to the destination node. For instance, once a path between the source node and the destination node has been determined to be trusted and approved, a condition associated with the approval process may require the path to remain constant until the session is closed so that any data sent from the source node to the destination node would use that particular trusted and approved path. In another example, the approval process may require that over a period of time, the trusted path to remain constant and any deviation should be from the predictable set of nodes. When the trusted path remains constant, the source node is required to use the trusted path when transmitting data to the destination node. In one embodiment, the predictable set of nodes may be retrieved from a machine learning module, as described in detail below.

Once the paths are approved as trusted paths, the paths are stored in a trusted route table as legitimate trusted routes between a source and destination that a packet may be transmitted through. Over a period of time, periodically, or continuously, the trace route operation may be implemented to collect new paths or new potential paths. As the trace route operation determines new paths or new potential paths, the trusted route table is modified or updated. In the same spirit, old paths, paths that have been determined faulty, or paths with untrusted nodes may be deleted from the trusted route table or have been labeled as untrusted. In another embodiment, intermediary nodes within the untrusted or faulty paths may be determined. The untrusted or faulty intermediary nodes may then also be noted in a log.

In one embodiment, over the period of time, the data collected through the route determination operations may be analyzed to provide predictions of new routes or new intermediary nodes within the routes. For example, data collected from a set of route determination operations may reveal that certain nodes are always marked as trusted. Based on this assessment, any connection between the nodes that are always marked as trusted will also be marked as trusted. In another example, data collected from a set of route determination operations could reveal that certain path behaviors that may lead to potential threats. The paths may be labeled as untrusted or analysis of the paths can identify the intermediary nodes that are potential threats.

The predictions regarding the trustworthiness of paths or intermediary nodes within the paths may be the result of machine learning operations. For example, data collected through multiple route determination operations and other data transmission operations (such as data transmission failures) can be assessed by a machine learning component that comprises algorithms that can learn from and make predictions on the data through the building of models from sample inputs.

In an embodiment, the route determination operation, the analysis of the paths discovered by the route determination operation, and the storage of the discovered paths and potential new paths may be implemented by a controller integrated or associated with multiple source nodes.

Figure 5A:
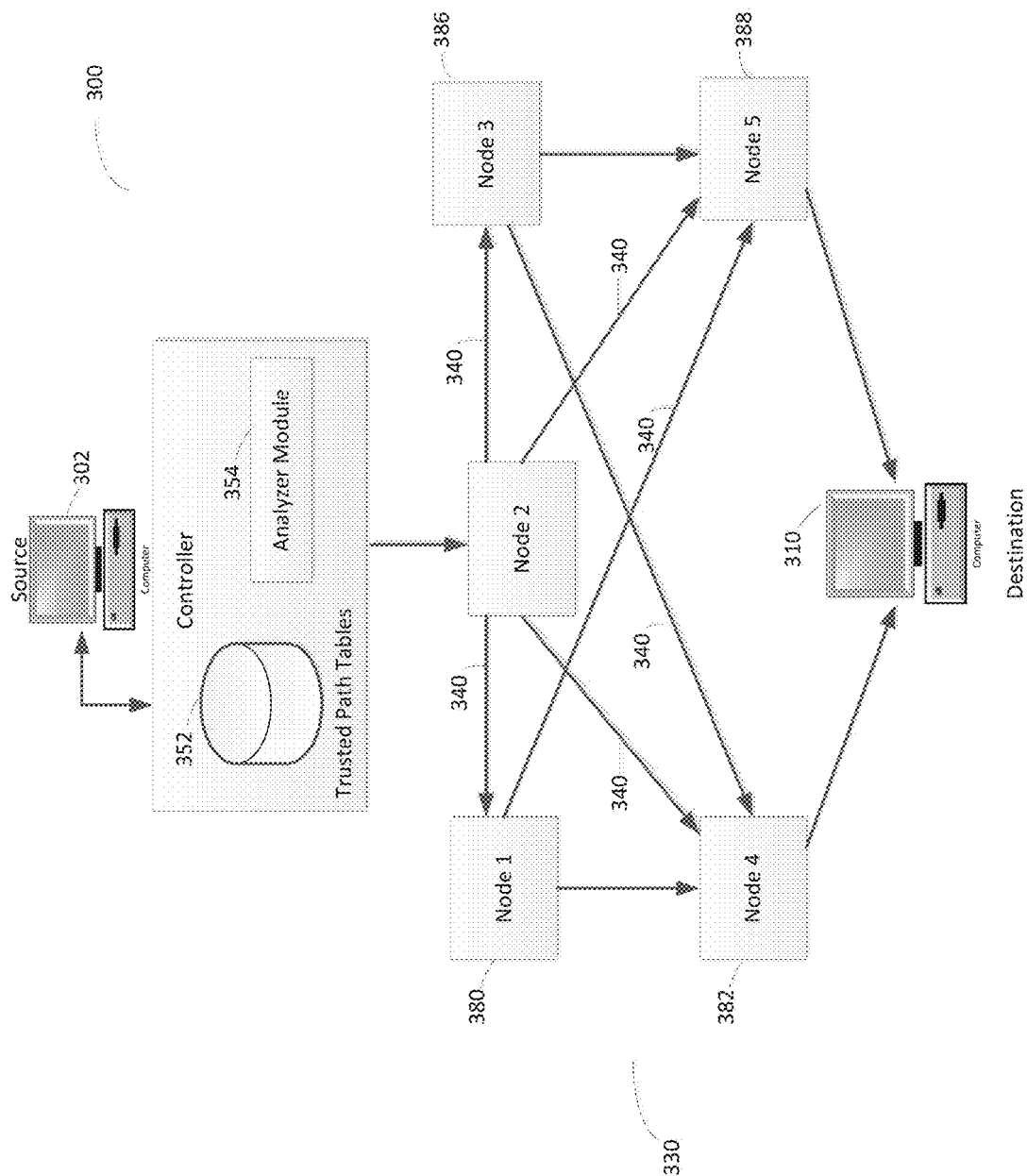
FIG. 5A illustrates an example block diagram of a network analysis system for determining multiple paths between a source node and a destination node on a network.

For example, FIG. 5A illustrates an example block diagram of a network analysis system 300 for determining multiple paths between the multiple source nodes 302 and a destination node 310 on a network 330. The source nodes 302 and destination node 310 communicate via a communications paths that include one or more intermediate node 380, 382, 384, 386 and 388. These nodes 380-388 may include routers that dynamically determine the path between the source node 302 and destination node 310 using, for example, routing tables that indicate a next hop from one intermediate node to another intermediate node associated with an address corresponding to destination node 310. The address corresponding to destination node 310 may be the actual IP address of destination node 310, a translation of the IP address of destination node 310, a virtual IP address of destination node 310, and so on.

A controller of the network analysis system 300 may be a module of the source device. In another embodiment, the controller may be external to the source device. In such an embodiment, the controller also communicates with either the source device or a component associated with the source device that performs some or all of the path determination tasks detailed above. The controller may interact with a user of the system 300 via a user interface 360.

Although the components of this system are illustrated as individual blocks, for ease of understanding, one of skill in the art will recognize that the functional partitioning may be changed, depending upon the particular embodiment of this invention. For example, the controller and other components in the system 300, such as the Trusted Path Tables 352 and the analyzer module 354 may be separate and disparate components that are associated. In another embodiment, the components, such as the controller 350, the trusted path table 352, and the analyzer module 354, may be part of the same device. In some embodiments, the controller 350 may be one integrated component in the source device 302. In some embodiments, system 300 includes monitors. The monitors may be associated with each node, including the source node and destination node. Information from the monitors may be transmitted to the controller. In some embodiment, some of the monitoring functions may be performed by the controller 350, leaving the monitors to perform a limited set of these monitoring functions. In like manner, the determined paths 340 may be stored in a trusted path table 352 that may contain other information related to the elements of the network.

In an embodiment, the route determination operation, the analysis of the paths discovered by the route determination operation, and the storage of the discovered paths and potential new paths may be implemented by a controller that is associated with multiple source nodes as shown in FIG. 7.

Figure 5B:
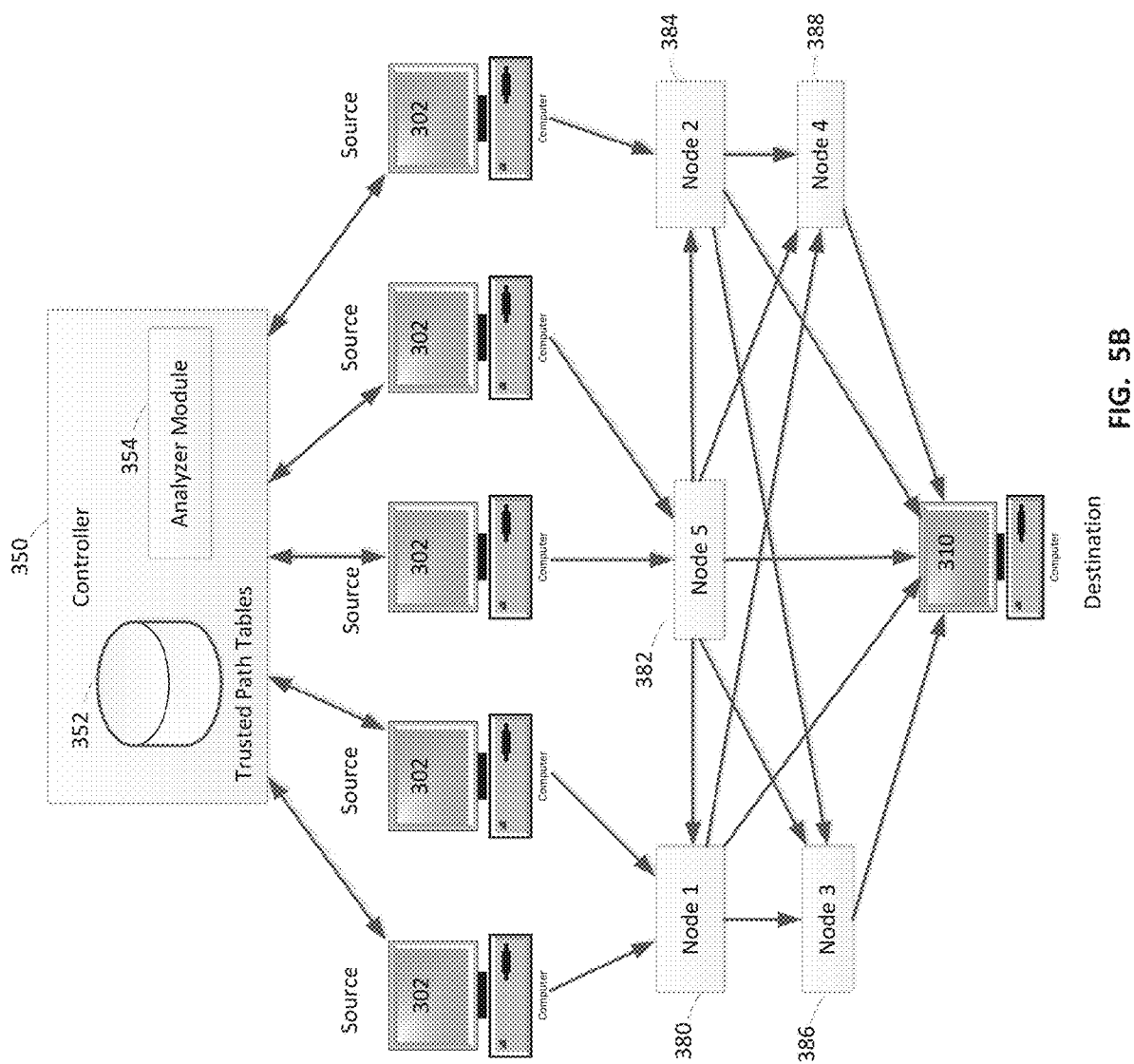
FIG. 5B illustrates another example block diagram of a network analysis system for determining multiple paths between a source node and a destination node on a network.

In FIG. 5B, multiple source nodes and multiple destination nodes may be part of the network analysis system 300. Each source node 302 may transmit data to the destination node 310 via any set of intermediary nodes 380, 382, 384, 386 and 388. Prior to or after the transmission of data from the source node to the destination node, the source node may transmit path determination data to the controller, wherein the transmit path determination data resulted from a route determination operation from the source node to the destination node. In one embodiment, the path determination data comprises at least a set of paths from the source node to the destination node. In response to transmitting path determination data to the controller, the source node may receive an indication if the paths identified in the path determination data are trusted or not trusted and/or conditions or approvals associated with the use of the identified routes from a controller 350. In response to receiving data associated with the transmission of data, the source node may receive an analysis of the path used to transmit the data. For example, the source node may receive an indication that the path used to transmit the data was an untrusted path and/or alternative trusted paths.

The controller 350 receiving the path determination data from the source nodes 302 may analyze the data using the analyzer module 354 and the trusted path table 352. The trusted path table 352 may store trusted paths, untrusted paths, trusted nodes and/or untrusted nodes. The analyzer module 354 receives the data and normalizes the data identify a sequence of nodes that makes up the path. The analyzer module 354 then determines if the sequence of nodes is a trusted sequence. In one embodiment, the analyzer module 354 compares the received sequence of nodes to the sequence of nodes for each path stored in the trusted path table 352. If the received sequence of nodes matches a trusted path stored in the trusted path table 352, the controller 350, in one embodiment, sends a confirmation message to the source node 302 that the path is a trusted path. If the received sequence of node matches an untrusted path stored in the path table 352 or in a log of untrusted paths or nodes, the controller, in one embodiment, sends a message indicating the path is untrusted and/or a recommendation of a trusted path. If the received sequence of nodes does not match a trusted or untrusted path stored in the path table 352 or in the log of untreated paths or nodes, the analyzer module 354 determines if each node of the received sequence of nodes is trusted node that is part of at least one trusted path stored in the trusted path table. If each node of the received sequence of nodes is a trusted node, then the controller stores the sequence of nodes as a trusted path in the trusted path table 352.

Figure 6A:
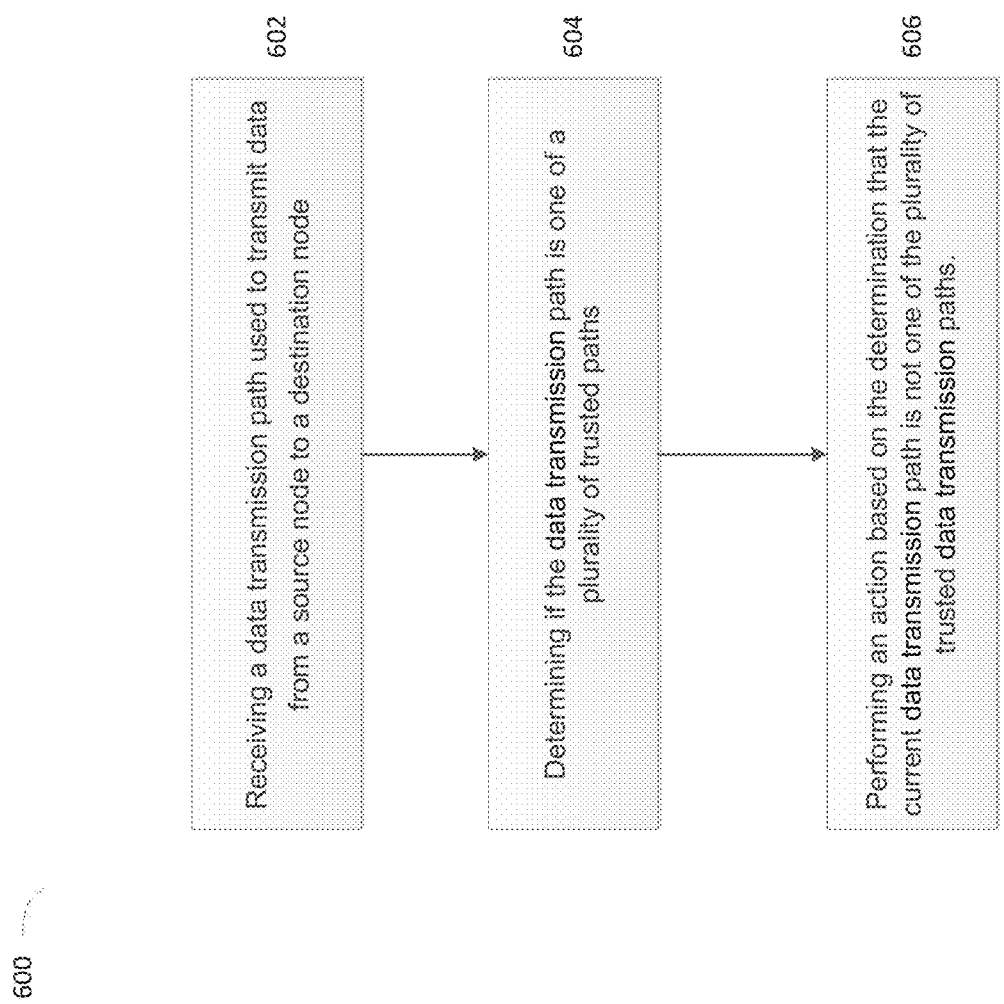
FIG. 6A illustrates a flow diagram for identifying untrusted paths in a network analysis system.
Figure 6B:
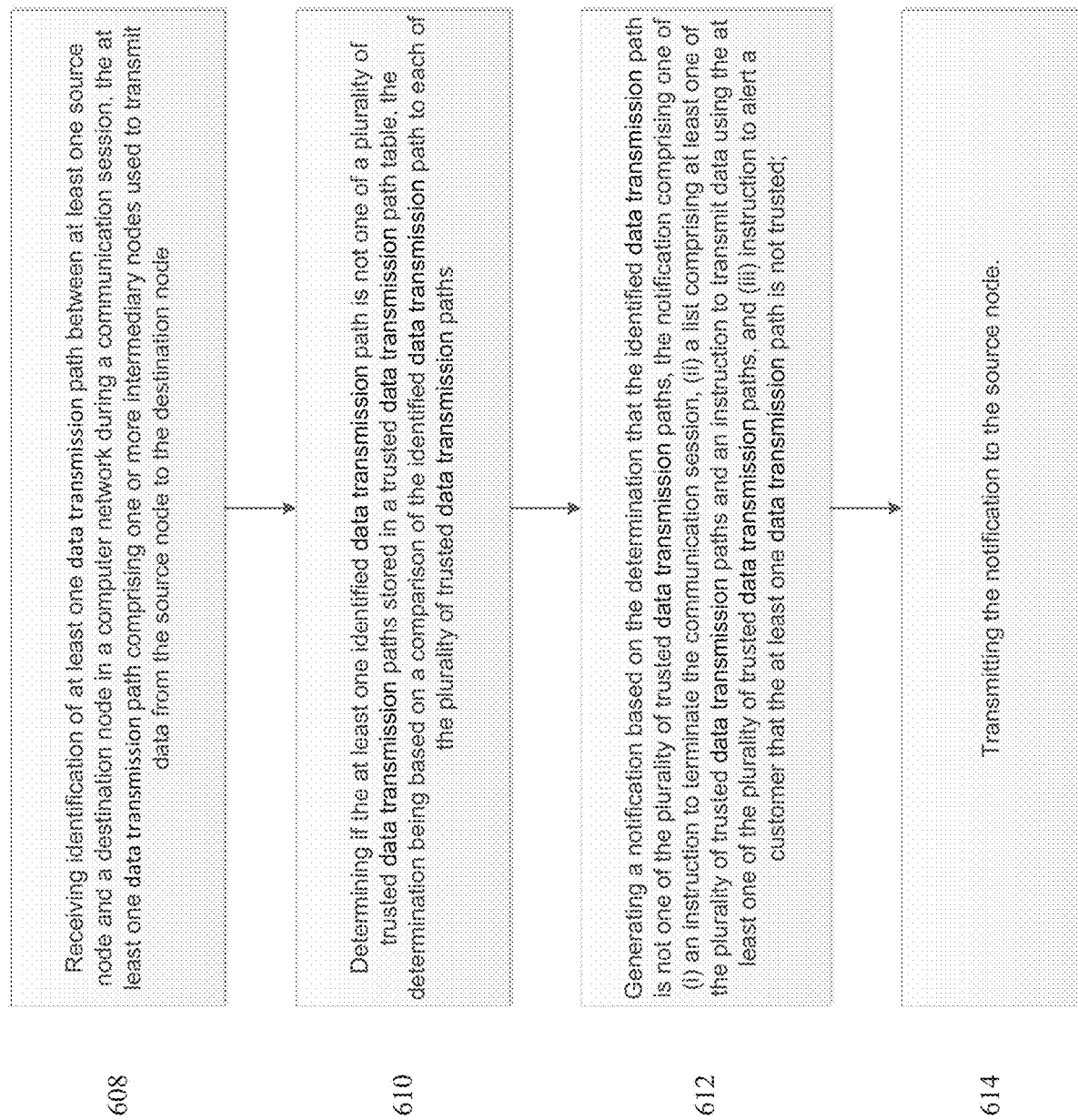
FIG. 6B illustrates a flow diagram for identifying potential threats by determining if received data was transmitted through an untrusted path.

The system described in FIGS. 5A and 5B, can provide a non-intrusive threat detection by determining if received data was transmitted using a trusted path or untrusted path, as illustrated in the flow diagrams in FIGS. 6A and 6B.

FIG. 6A illustrates a flow diagram flow diagram for identifying potential threats by identifying untrusted data transmission paths.

At step 602, a controller module receives a path used or a potential path that will be used to transmit data from a source node to a destination node. In one embodiment, the source node will initiate a route determination operation either before or after transmitting data to the destination node. The route determination operation will provide indication of the path used or potential paths that may be used to transmit data from the source node to the destination node.

In one embodiment, the controller module is a central server that receives path information or potential path information that will be used to transmit data from a source node to a destination node from multiple source nodes. At step 604, the controller module determines if the received path is one of a plurality of trusted paths.

In one embodiment, the controller module assesses each received path to determine if the paths are trusted. If the paths are trusted, they are stored in the trusted path database associated with the controller module. The trust path database may store and designate paths as being trusted or untrusted. If the received path is designated untrusted, it may be stored in a log that comprises a list of untrusted paths. The log may also include a trust level for each of the untrusted paths listed in the log. By assessing the paths from the different source nodes, the controller may generate a comprehensive list of trusted and a list untrusted paths and the nodes associated with the trusted and untrusted paths. Machine learning models use the comprehensive list of trusted and list of untrusted paths to predict new paths that may be added to the trust path database.

In assessing each path, the controller module may first check to see if the received paths is already stored in the trusted path database or are derivatives of the trusted paths stored in the trusted path database.

If the path is already stored in the trusted path database and/or designated as a trusted path, the controller may move on and assess the next received path.

If the path is not stored in the trusted path database, the controller may determine if each node in the path is a trusted node used in other trusted paths stored in the trusted path database. If each node is a trusted node, then the controller may store the path as a new trusted path in the trusted path table In one embodiment, the route determination operation provided at least one path as well as additional information associated with each path, such as transmission time, network traffic, router traffic, transmission time between each of the nodes in the path. The trusted path along with the additional information may be stored trusted path table. If during a subsequent route determination operation, one of the trusted paths has additional information that is contrary to the already stored additional information, the trusted path table may be updated so the received trusted path reflects the new additional information. For example, if path 1 is stored in the trusted path table along with a total transmission time of 10 seconds, and then a subsequent route determination operations returns path 1 with information indicating a total transmission time of 20 seconds, the trusted path table will update the information associated with path 1 to indicate a 20 second total transmission time. Additionally or alternatively, each of the trusted node from the trusted paths may be stored along with the additional information.

If the path is designated as an untrusted path because the path does not match any of the paths trusted path table or is not a derivative of the paths stored in the trusted path table, then the controller may store the path as an untrusted path in the log of untrusted paths and update a trust level of the untrusted path stored in the log. Additionally, the controller may send a message to the source node that the path is untrusted and/or the trust level of the path.

At step 606, the controller module performs at least one action based on the determination that the identified path is not one of the pluralities of trusted paths.

In one embodiment, the controller may send a message to the source node and/or other source nodes within the computer network that at least one node was an untrusted node or that a path is untrusted.

In another embodiment, the controller may provide the source node trusted paths that may be used to transmit the data to the destination node. The controller may send at least one trusted path that the source node may use to transmit data. Optionally, the message may also comprise additional information associated with each trusted path, such as transmission time or network traffic information. The source node may use the additional information to select one of the trusted paths to use to transmit data. In some instances, the controller may rank the trusted paths based on the additional information associated with the trusted path, such as ranked by fasted overall transmission time or least network traffic. The controller may send a selected number of trusted paths that ranked the highest, so the user may have a set of paths to choose from to transmit data.

In another instance, the controller may send a message to the source node listing the untrusted node/nodes and optionally information associated with the untrusted node/nodes, such as trust levels. After receiving information, by the controller node, regarding untrusted nodes, the source node may specify paths to transfer the data that do not include the untrusted nodes.

FIG. 6B illustrates a flow diagram flow diagram for identifying potential threats.

At step 608, a control module receives identification of at least one path between at least one source node and a destination node in a computer network during a communication session, the at least one path comprising one or more intermediary nodes used to transmit data from the source node to the destination node.

In one embodiment, the control module receives routing information associated with a potential transmission of data from at least one of a plurality of source node to a destination node. The routing information being obtained through a route determination operation. The information resulting from at least one route determination operation may be normalized. Normalization may include transforming the information resulting from the route determination operation into a standardized form. In one embodiment, the source node transmits the information resulting from the route determination operation and/or the identified path to a controller server. In another embodiment, the controller module is part of the source node.

The controller module identifies a path that may be used to transmit the data from the at least one source node to the destination node based on the routing information. The path includes a set of intermediary nodes between the source node and the destination node. At step 610, the controller module determines if the at least one identified path is not one of a plurality of trusted paths stored in a trusted path table, the determination being based on a comparison of the identified path to each of the plurality of trusted paths. In one embodiment, the controller module may determine if the at least one identified path is a derivative of the plurality of trusted paths stored in the trusted table. If the identified path is a derivative of the plurality of trusted paths, then the identified path may be saved as a trusted path in the trusted path table.

In another embodiment, the controller module may compare the intermediary nodes associated with the identified path with the intermediary nodes associated with the plurality of trusted paths stored in the trusted path table. If all the intermediary nodes associated with the identified path are intermediary nodes of at least one trusted path stored in the trusted path table, then the identified path is a trusted path.

If each node of the at least one identified path is a trusted path, then the controller module continues to wait for new routing information to analyze.

If each node of the at least one identified path is not a trusted path, then the controller module performs an action at step 612. In one embodiment, the controller may send a message to the source node and/or other source nodes within the computer network that at least one node was an untrusted node. In another embodiment, the controller may provide the source node trusted paths that may be used to transmit the data to the destination node. The controller node, in yet another embodiment, may add the faulty node to the list of nodes that are untrusted in the trusted path table, or instruct the source node to terminate the communication session.

At step 614, the notification is transmitted to the source node. This step may be optional if the controller is not part of the source node.

In further embodiments, when the controller receives identification of a first path when a communication session is first initiated between a source node and a destination node, the first path or the first set of paths are automatically considered to be trusted paths. After the initial identification of the first path, the source node will, periodically or based on a timed interval, send out further route determination operations and the controller will receive identification of paths generated for each timed interval.

For example, at time interval 2, the controller will receive identification of at least a second path between the at least one source node and the destination node in the computer network during the communication session, the identification of the second path being received after the identification of the at least one path was received. The controller will then determine if the second path is not one of a plurality of trusted paths stored in a trusted path table, the determination being based on a comparison of the identified second path to each of the plurality of trusted paths stored in the trusted path table, and store the second path as an untrusted path in a log comprising a plurality of untrusted paths when the second path is not one of a plurality of trusted paths stored in the trusted path table, the second path being assigned a trust level.

At time interval 3, the controller will receive identification of at least a third path between the at least one source node and the destination node in the computer network during the communication session, the identification of the third path being received after the identification of the second path was received. The controller will then determine if the third path is not one of a plurality of trusted paths stored in a trusted path table, the determination being based on a comparison of the identified third path to each of the plurality of trusted paths stored in the trusted path table; and determine if the third path is one of the plurality of untrusted paths stored in the log when the third path is not one of the plurality of trusted paths. When the path is one of the pluralities of untrusted paths in the log, the trust level of the third path will increase. In other words, the assigned trust level for the third path increases each time the identification of the third path is received.

For example, FIGS. 7A-7E provides examples of the controller analyzing paths to determine if the path is a trusted path.

Figure 7A:
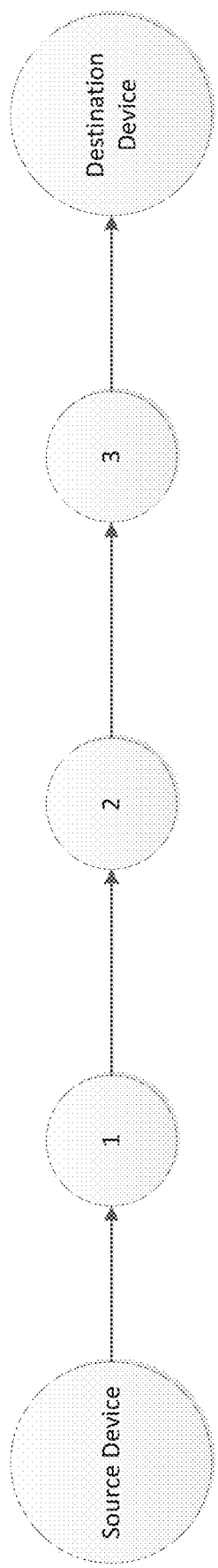
FIG. 7A depicts an example of a trusted path.
Figure 7B:
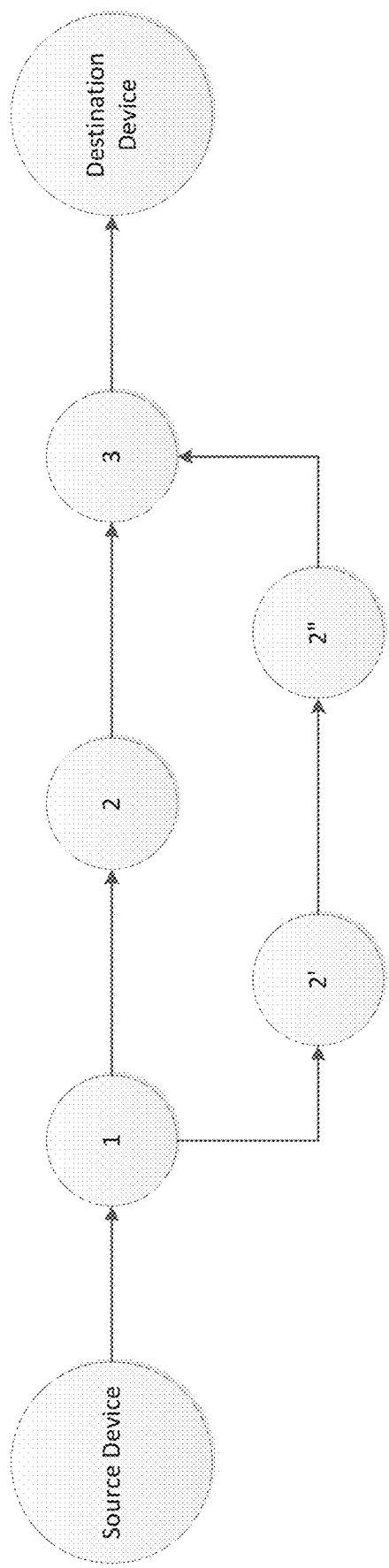
FIG. 7B depicts an example of a trusted path for the embodiment shown in FIG. 7A.
Figure 7C:
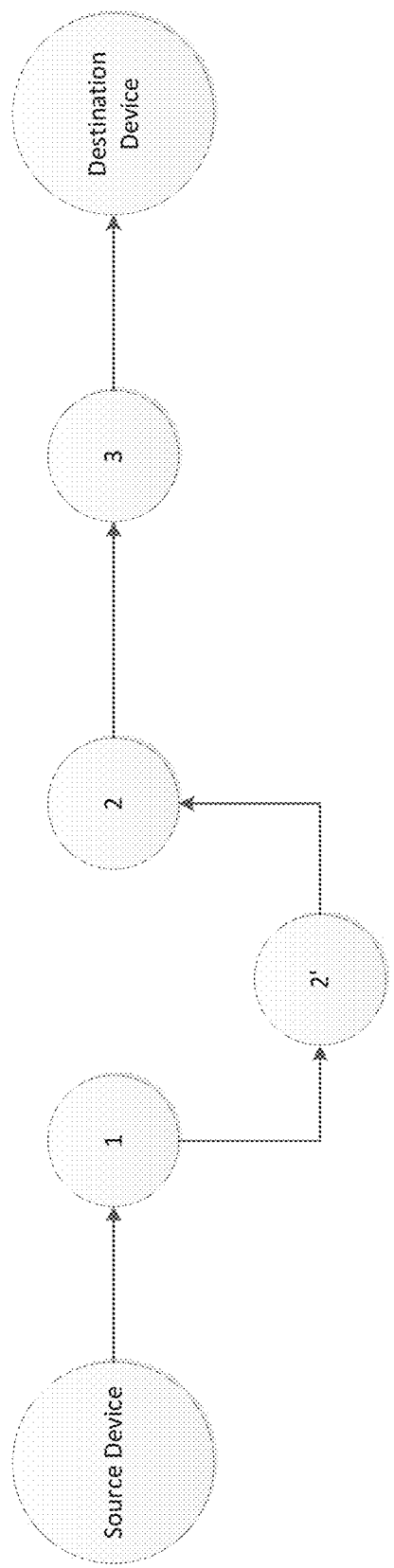
FIG. 7C depicts another example of a trusted path for the embodiment shown in FIG. 7A.
Figure 7D:
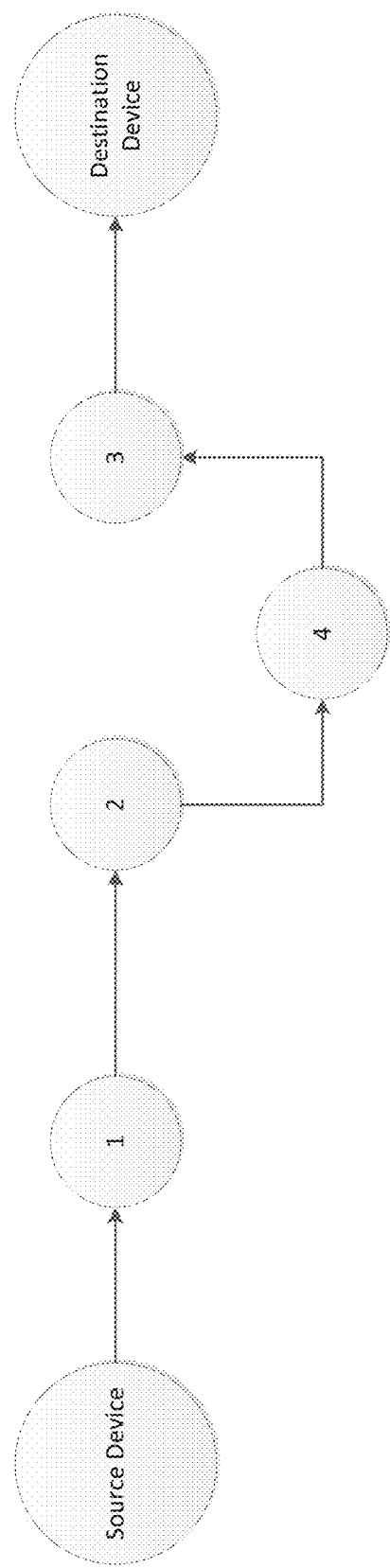
FIG. 7D depicts another example of an untrusted path for the embodiment shown in FIG. 7A.

FIGS. 7A-B illustrate two initial paths that have been determined to be trusted paths. These paths are stored in the trusted path table. Data that is transmitted using path 1: {Source→1→2→3→Destination} or path 2: {Source→1→2'→2"→3→Destination} are stored as trusted paths. The controller, when analyzing the trusted paths, will also label path 3: {Source→1→2'→2→3→Destination}, as illustrated in FIG. 7C as a trusted potential path because each node in path 3 is included in one of the paths that are labeled as trusted, path 1 and path 2. In other words, a path is considered a trusted potential path when each node in the potential path is a node that is included in one of the plurality of trusted paths. The trusted potential paths are also stored in the trusted path table.

Figure 7E:
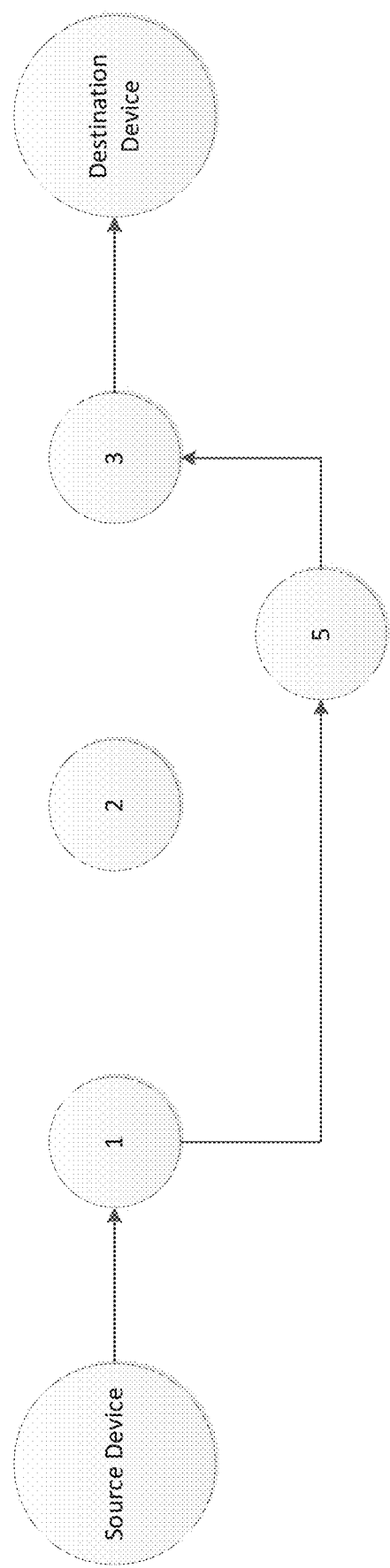
FIG. 7E depicts another example of an untrusted path for the embodiment shown in FIG. 7A.

When the controller receives data that was transmitted from a source device, the controller may determine the path used to transmit the data, the current path information. In one embodiment, the current path information may be included with the data. The controller compares the current path with stored trusted paths and stored trusted potential paths. For example, in FIG. 7D, data may have been transmitted from a source device to a destination device using path 4: {Source→1→2→4→3→Destination}. However, path 4 is not one of the trusted paths or trusted potential paths because the path includes node 4. Node 4 is not a node that is part of any of the trusted paths or trusted potential paths. Therefore, the controller will treat path 4 as an untrusted path. Similarly, FIG. 7E illustrates another example of an untrusted path, path 5. Path 5 comprises {Source→1→5→3→Destination}. Node 5, similar to node 4, is not a node that is part of any of the trusted paths or trusted potential paths. Therefore, the controller will treat path 5 as an untrusted path.

If the current path is the same as one of the trusted paths or potentially trusted paths, the data is forwarded to the destination node. For example, path 3, in the example illustrated in FIG. 7C, is a trusted path because all the nodes within the path 3 are included in at least one of the stored trusted paths. In one embodiment, the new trusted path, path 3, would be added to the trusted path table.

If the current path is not one of the plurality of trusted paths or potentially trusted paths, then an action is performed. In one embodiment, performing an action includes notifying the source node that the data was not transmitted on a trusted path and is suspicious, blocking the transmission of the data to the destination node, labeling the data as suspicious, blocking subsequent data transmitted from the source node and the like. In one embodiment, a log may be generated of the transmissions that were labeled as suspicious. The controller may use the log to determine particular intermediary nodes that may be malicious.

In another example of an action that may be performed, a connection of the source node and the computer network may be dropped or the connection of the source node and the faulty intermediary node may be dropped. The connection may then be re-established again and trust needs to be defined again. In another example, the destination node may be aware of the trust level of the connection as defined in a trusted node table instead of a trusted path table. In yet another example, the destination node may be aware of the trust level of the connection as defined in the trust node table. The destination can then decide whether or not to re-establish the connection.

Figure 8A:
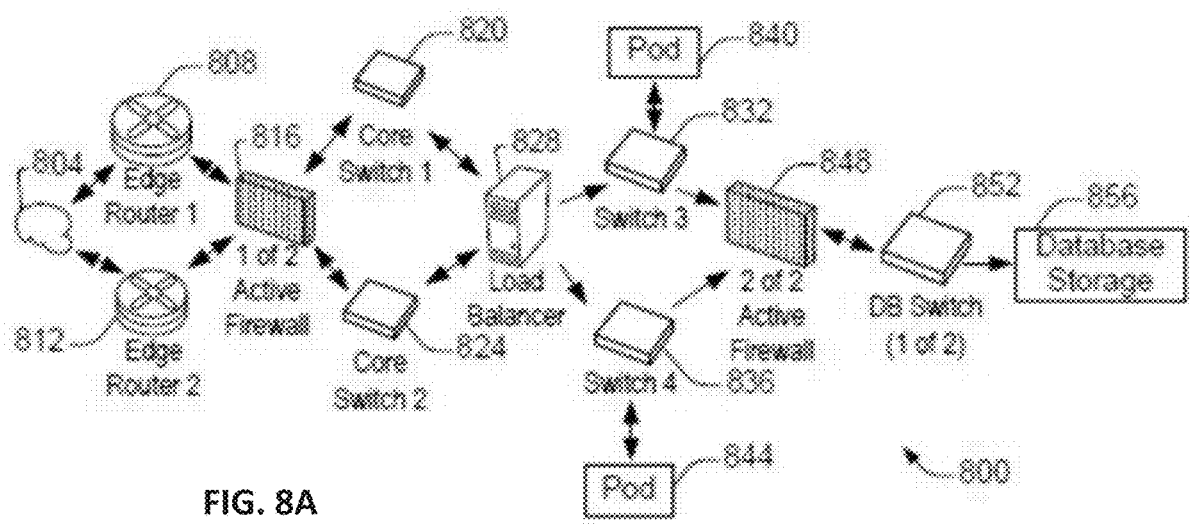
FIG. 8A shows a system diagram illustrating architectural components of an applicable environment, in accordance with some embodiments.

FIG. 8A shows a system diagram 800 illustrating architectural components of an on-demand service environment, in accordance with some embodiments. A client machine located in the cloud 804 (or Internet) may communicate with the on-demand service environment via one or more edge routers 808 and 812. The edge routers may communicate with one or more core switches 820 and 824 via firewall 816. The core switches may communicate with a load balancer 828, which may distribute server load over different pods, such as the pods 840 and 844. The pods 840 and 844, which may each include one or more servers and/or other computing resources, may perform data processing and other operations used to provide on-demand services. Communication with the pods may be conducted via pod switches 832 and 836. Components of the on-demand service environment may communicate with a database storage system 856 via a database firewall 848 and a database switch 852.

Figure 8B:
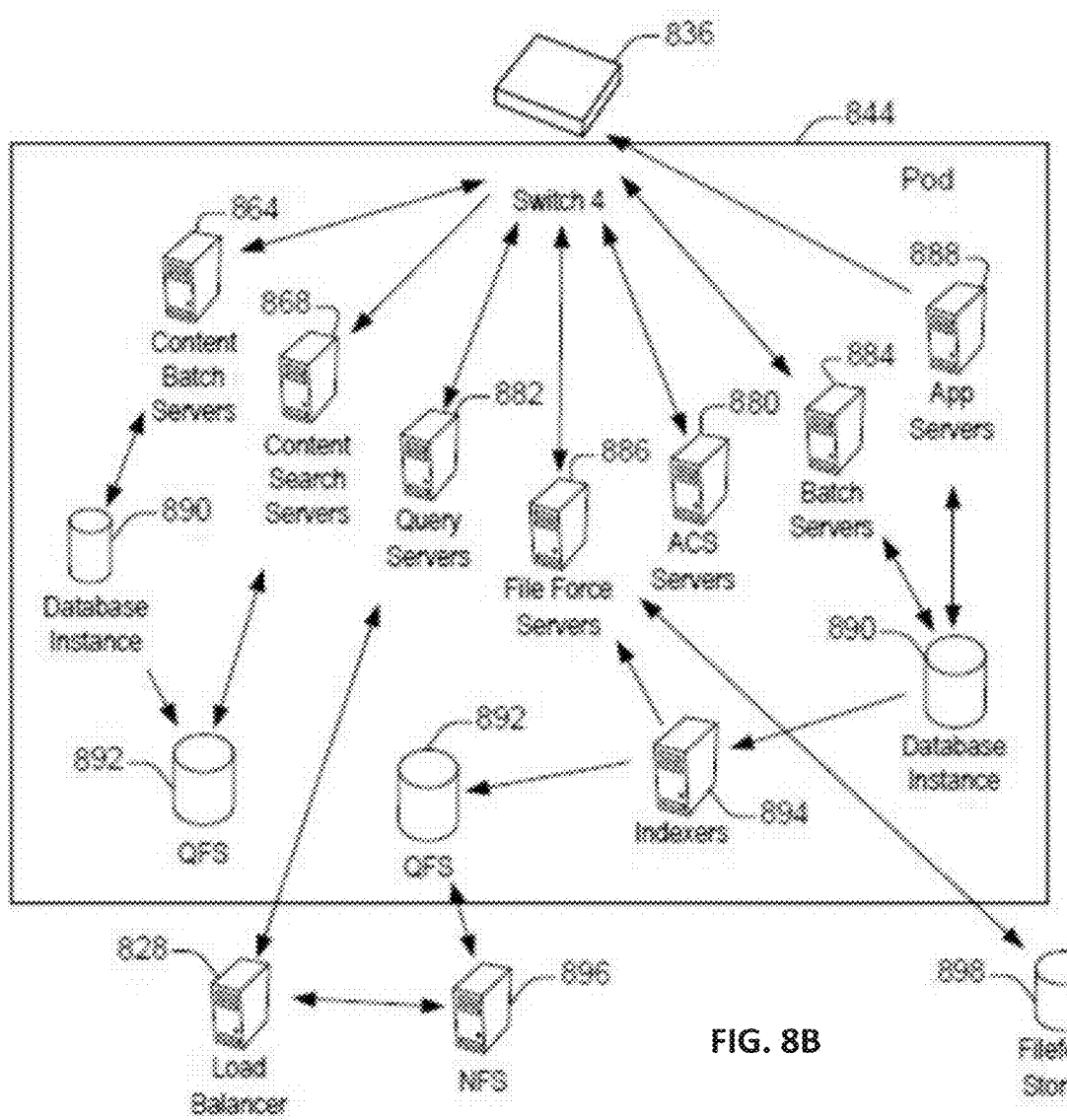
FIG. 8B shows a system diagram further illustrating architectural components of an applicable environment, in accordance with some embodiments.

As shown in FIGS. 8A and 8B, accessing an on-demand service environment may involve communications transmitted among a variety of different hardware and/or software components. Further, the on-demand service environment 800 is a simplified representation of an actual on-demand service environment. For example, while only one or two devices of each type are shown in FIGS. 8A and 8B, some embodiments of an on-demand service environment may include anywhere from one to many devices of each type. Also, the on-demand service environment need not include each device shown in FIGS. 8A and 8B, or may include additional devices not shown in FIGS. 8A and 8B.

Moreover, one or more of the devices in the on-demand service environment 800 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 804 is intended to refer to a data network or plurality of data networks, often including the Internet. Client machines located in the cloud 804 may communicate with the on-demand service environment to access services provided by the on-demand service environment. For example, client machines may access the on-demand service environment to retrieve, store, edit, and/or process information.

In some embodiments, the edge routers 808 and 812 route packets between the cloud 804 and other components of the on-demand service environment 800. The edge routers 808 and 812 may employ the Border Gateway Protocol (BGP). The BGP is the core routing protocol of the Internet. The edge routers 808 and 812 may maintain a table of IP networks or 'prefixes' which designate network reachability among autonomous systems on the Internet.

In one or more embodiments, the firewall 816 may protect the inner components of the on-demand service environment 800 from Internet traffic. The firewall 816 may block, permit, or deny access to the inner components of the on-demand service environment 800 based upon a set of rules and other criteria. The firewall 816 may act as one or more of a packet filter, an application gateway, a stateful filter, a proxy server, or any other type of firewall.

In some embodiments, the core switches 820 and 824 are high-capacity switches that transfer packets within the on-demand service environment 800. The core switches 820 and 824 may be configured as network bridges that quickly route data between different components within the on-demand service environment. In some embodiments, the use of two or more core switches 820 and 824 may provide redundancy and/or reduced latency.

In some embodiments, the pods 840 and 844 may perform the core data processing and service functions provided by the on-demand service environment. Each pod may include various types of hardware and/or software computing resources. An example of the pod architecture is discussed in greater detail with reference to FIG. 8B.

In some embodiments, communication between the pods 840 and 844 may be conducted via the pod switches 832 and 836. The pod switches 832 and 836 may facilitate communication between the pods 840 and 844 and client machines located in the cloud 804, for example via core switches 820 and 824. Also, the pod switches 832 and 836 may facilitate communication between the pods 840 and 844 and the database storage 856.

In some embodiments, the load balancer 828 may distribute workload between the pods 840 and 844. Balancing the on-demand service requests between the pods may assist in improving the use of resources, increasing throughput, reducing response times, and/or reducing overhead. The load balancer 828 may include multilayer switches to analyze and forward traffic.

In some embodiments, access to the database storage 856 may be guarded by a database firewall 848. The database firewall 848 may act as a computer application firewall operating at the database application layer of a protocol stack. The database firewall 848 may protect the database storage 856 from application attacks such as structure query language (SQL) injection, database rootkits, and unauthorized information disclosure.

In some embodiments, the database firewall 848 may include a host using one or more forms of reverse proxy services to proxy traffic before passing it to a gateway router. The database firewall 848 may inspect the contents of database traffic and block certain content or database requests. The database firewall 848 may work on the SQL application level atop the TCP/IP stack, managing applications' connection to the database or SQL management interfaces as well as intercepting and enforcing packets traveling to or from a database network or application interface.

In some embodiments, communication with the database storage system 856 may be conducted via the database switch 852. The multi-tenant database system 856 may include more than one hardware and/or software components for handling database queries. Accordingly, the database switch 852 may direct database queries transmitted by other components of the on-demand service environment (e.g., the pods 840 and 844) to the correct components within the database storage system 856. In some embodiments, the database storage system 856 is an on-demand database system shared by many different organizations. The on-demand database system may employ a multi-tenant approach, a virtualized approach, or any other type of database approach. An on-demand database system is discussed in greater detail with reference to FIGS. 9 and 10.

FIG. 8B shows a system diagram illustrating the architecture of the pod 844, in accordance with one embodiment. The pod 844 may be used to render services to a user of the on-demand service environment 800. In some embodiments, each pod may include a variety of servers and/or other systems. The pod 844 includes one or more content batch servers 864, content search servers 868, query servers 872, file force servers 876, access control system (ACS) servers 880, batch servers 884, and app servers 888. Also, the pod 844 includes database instances 890, quick file systems (QFS) 892, and indexers 894. In one or more embodiments, some or all communication between the servers in the pod 844 may be transmitted via the switch 836.

In some embodiments, the application servers 888 may include a hardware and/or software framework dedicated to the execution of procedures (e.g., programs, routines, scripts) for supporting the construction of applications provided by the on-demand service environment 800 via the pod 844. Some such procedures may include operations for providing the services described herein. The content batch servers 864 may requests internal to the pod. These requests may be long-running and/or not tied to a particular customer. For example, the content batch servers 864 may handle requests related to log mining, cleanup work, and maintenance tasks.

The content search servers 868 may provide query and indexer functions. For example, the functions provided by the content search servers 868 may allow users to search through content stored in the on-demand service environment. The Fileforce servers 876 may manage requests information stored in the Fileforce storage 878. The Fileforce storage 878 may store information such as documents, images, and basic large objects (BLOBs). By managing requests for information using the Fileforce servers 876, the image footprint on the database may be reduced.

The query servers 872 may be used to retrieve information from one or more file systems. For example, the query system 872 may receive requests for information from the app servers 888 and then transmit information queries to the NFS 896 located outside the pod. The pod 844 may share a database instance 890 configured as a multi-tenant environment in which different organizations share access to the same database. Additionally, services rendered by the pod 844 may require various hardware and/or software resources. In some embodiments, the ACS servers 880 may control access to data, hardware resources, or software resources.

In some embodiments, the batch servers 884 may process batch jobs, which are used to run tasks at specified times. Thus, the batch servers 884 may transmit instructions to other servers, such as the app servers 888, to trigger the batch jobs. For some embodiments, the QFS 892 may be an open source file system available from Sun Microsystems® of Santa Clara, Calif. The QFS may serve as a rapid-access file system for storing and accessing information available within the pod 844. The QFS 892 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 868 and/or indexers 894 to identify, retrieve, move, and/or update data stored in the network file systems 896 and/or other storage systems.

In some embodiments, one or more query servers 872 may communicate with the NFS 896 to retrieve and/or update information stored outside of the pod 844. The NFS 896 may allow servers located in the pod 844 to access information to access files over a network in a manner similar to how local storage is accessed. In some embodiments, queries from the query servers 822 may be transmitted to the NFS 896 via the load balancer 820, which may distribute resource requests over various resources available in the on-demand service environment. The NFS 896 may also communicate with the QFS 892 to update the information stored on the NFS 896 and/or to provide information to the QFS 892 for use by servers located within the pod 844.

In some embodiments, the pod may include one or more database instances 890. The database instance 890 may transmit information to the QFS 892. When information is transmitted to the QFS, it may be available for use by servers within the pod 844 without requiring an additional database call. In some embodiments, database information may be transmitted to the indexer 894. Indexer 894 may provide an index of information available in the database 890 and/or QFS 892. The index information may be provided to file force servers 876 and/or the QFS 892.

Figure 9:
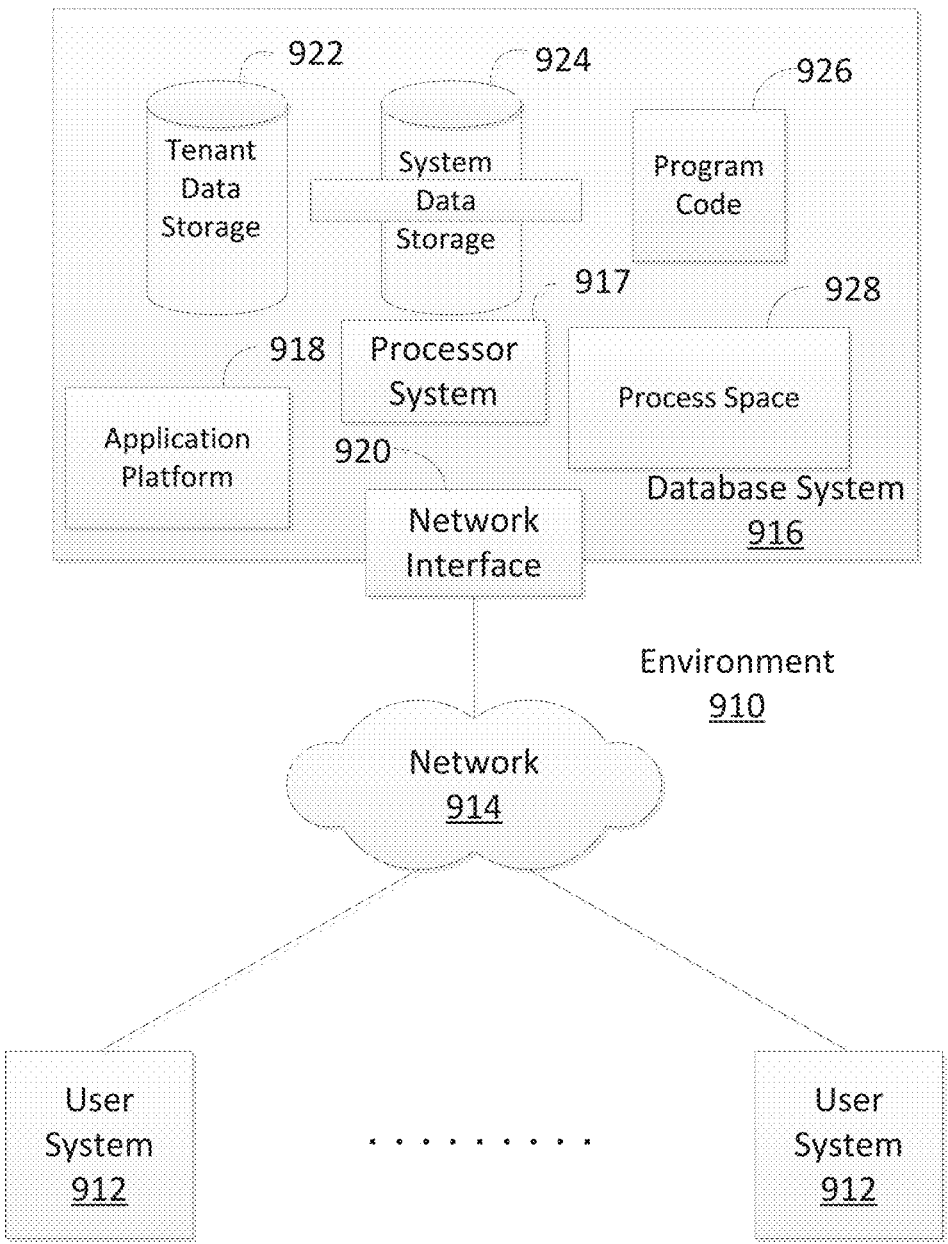
FIG. 9 shows a system diagram illustrating the architecture of a multi-tenant database environment, in accordance with some embodiments.
Figure 10:
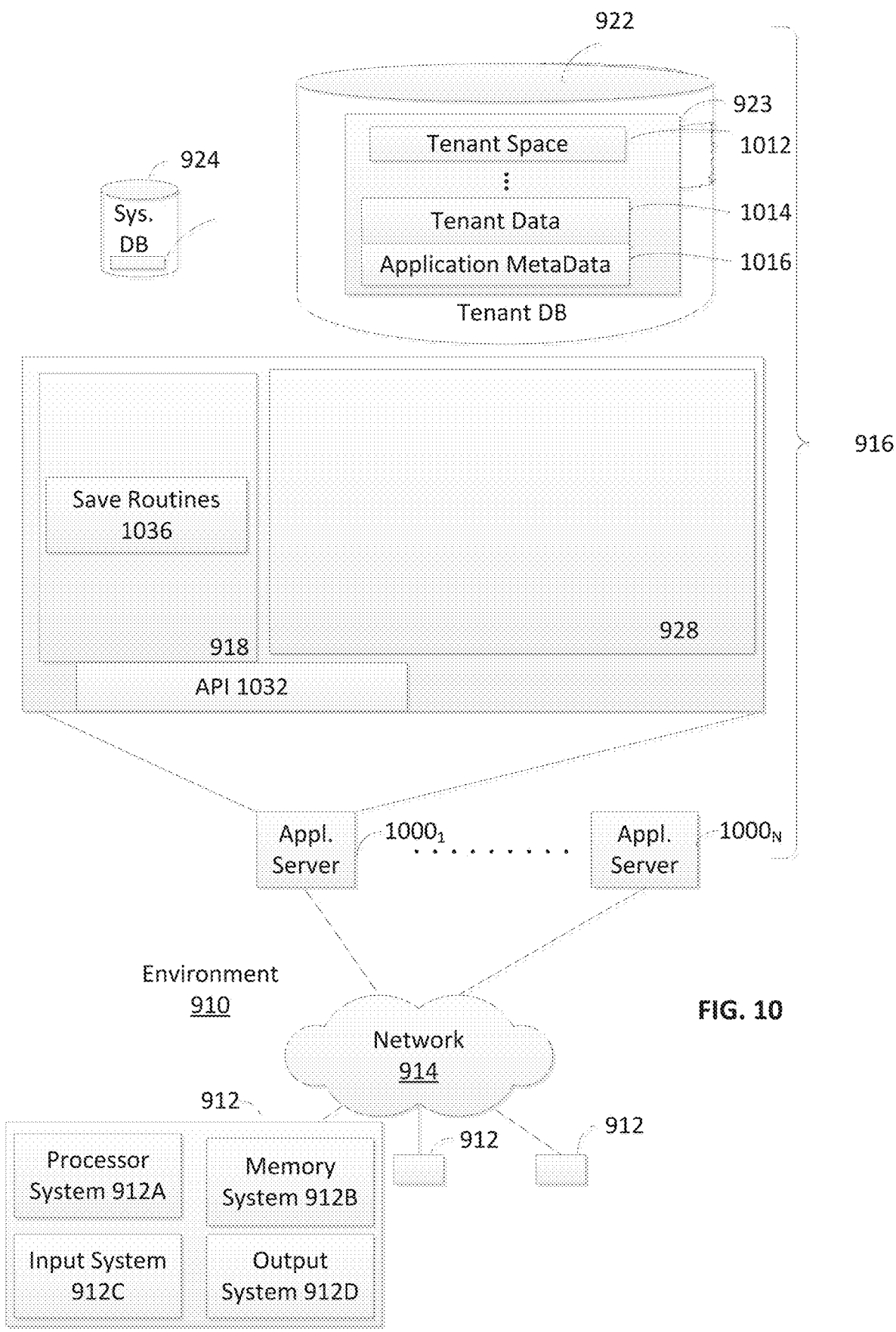
FIG. 10 shows a system diagram further illustrating the architecture of a multi-tenant database environment, in accordance with some embodiments.

FIG. 9 shows a block diagram of an environment 910 wherein an on-demand database service might be used, in accordance with some embodiments. Environment 910 includes an on-demand database service 916. User system 912 may be any machine or system that is used by a user to access a database user system. For example, any of user systems 912 can be a handheld computing system, a mobile phone, a laptop computer, a work station, and/or a network of computing systems. As illustrated in FIGS. 9 and 10, user systems 912 might interact via a network 914 with the on-demand database service 916.

An on-demand database service, such as system 916, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 916" and "system 916" will be used interchangeably herein. A database image may include one or more database objects. A relational database management system (RDBMS) or the equivalent may execute storage and retrieval of information against the database object(s). Application platform 918 may be a framework that allows the applications of system 916 to run, such as the hardware and/or software, e.g., the operating system. In an implementation, on-demand database service 916 may include an application platform 918 that enables creation, managing and executing one or more applications developed by the provider of the on-demand database service, users accessing the on-demand database service via user systems 912, or third party application developers accessing the on-demand database service via user systems 912.

One arrangement for elements of system 916 is shown in FIG. 9, including a network interface 920, application platform 918, tenant data storage 922 for tenant data 923, system data storage 924 for system data 925 accessible to system 916 and possibly multiple tenants, program code 926 for implementing various functions of system 916, and a process space 928 for executing MTS system processes and tenant-specific processes, such as running applications as part of an application hosting service. Additional processes that may execute on system 916 include database indexing processes.

The users of user systems 912 may differ in their respective capacities, and the capacity of a particular user system 912 might be entirely determined by permissions (permission levels) for the current user. For example, where a call center agent is using a particular user system 912 to interact with system 916, the user system 912 has the capacities allotted to that call center agent. However, while an administrator is using that user system to interact with system 916, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users may have different capabilities with regard to accessing and modifying application and database information, depending on a user's security or permission level.

Network 914 is any network or combination of networks of devices that communicate with one another. For example, network 914 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network (e.g., the Internet), that network will be used in many of the examples herein. However, it should be understood that the networks used in some embodiments are not so limited, although TCP/IP is a frequently implemented protocol.

User systems 912 might communicate with system 916 using TCP/IP and, at a higher network level, use other common Internet protocols to communicate, such as HTTP, FTP, AFS, WAP, etc. In an example where HTTP is used, user system 912 might include an HTTP client commonly referred to as a "browser" for sending and receiving HTTP messages to and from an HTTP server at system 916. Such an HTTP server might be implemented as the sole network interface between system 916 and network 914, but other techniques might be used as well or instead. In some embodiments, the interface between system 916 and network 914 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In some embodiments, system 916, shown in FIG. 9, implements a web-based customer relationship management (CRM) system. For example, in some embodiments, system 916 includes application servers configured to implement and execute CRM software applications as well as provide related data, code, forms, web pages and other information to and from user systems 912 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 916 implements applications other than, or in addition to, a CRM application. For example, system 916 may provide tenant access to multiple hosted (standard and custom) applications. User (or third party developer) applications, which may or may not include CRM, may be supported by the application platform 918, which manages creation, storage of the applications into one or more database objects and executing of the applications in a virtual machine in the process space of the system 916.

Each user system 912 could include a desktop personal computer, workstation, laptop, PDA, cell phone, or any wireless access protocol (WAP) enabled device or any other computing system capable of interfacing directly or indirectly to the Internet or other network connection. User system 912 typically runs an HTTP client, e.g., a browsing program, such as Microsoft's Internet Explorer® browser, Mozilla's Firefox® browser, Opera's browser, or a WAP-enabled browser in the case of a cell phone, PDA or other wireless device, or the like, allowing a user (e.g., subscriber of the multi-tenant database system) of user system 912 to access, process and view information, pages and applications available to it from system 916 over network 914.

Each user system 912 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 916 or other systems or servers. For example, the user interface device can be used to access data and applications hosted by system 916, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to some embodiments, each user system 912 and all of its components are operator configurable using applications, such as a browser, including computer code run using a central processing unit such as an Intel Pentium® processor or the like. Similarly, system 916 (and additional instances of an MTS, where more than one is present) and all of their components might be operator configurable using application(s) including computer code to run using a central processing unit such as processor system 917, which may include an Intel Pentium® processor or the like, and/or multiple processor units.

A computer program product implementation includes a machine-readable storage medium (media) having instructions stored thereon/in which can be used to program a computer to perform any of the processes of the embodiments described herein. Computer code for operating and configuring system 916 to intercommunicate and to process web pages, applications and other data and media content as described herein are preferably downloaded and stored on a hard disk, but the entire program code, or portions thereof, may also be stored in any other volatile or non-volatile memory medium or device, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, or transmitted over any other conventional network connection (e.g., extranet, VPN, LAN, etc.) using any communication medium and protocols (e.g., TCP/IP, HTTP, HTTPS, Ethernet, etc.). It will also be appreciated that computer code for implementing embodiments can be implemented in any programming language that can be executed on a client system and/or server or server system such as, for example, C, C++, HTML, any other markup language, Java™, JavaScript®, ActiveX®, any other scripting language, such as VBScript, and many other programming languages as are well known may be used. (Java™ is a trademark of Sun Microsystems®, Inc.).

According to some embodiments, each system 916 is configured to provide web pages, forms, applications, data and media content to user (client) systems 912 to support the access by user systems 912 as tenants of system 916. As such, system 916 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include logically and/or physically connected servers distributed locally or across one or more geographic locations. Additionally, the term "server" is meant to include a computing system, including processing hardware and process space(s), and an associated storage system and database application (e.g., OODBMS or RDBMS) as is well known in the art.

It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 10 also shows a block diagram of environment 910 further illustrating system 916 and various interconnections, in accordance with some embodiments. FIG. 10 shows that user system 912 may include processor system 912A, memory system 912B, input system 912C, and output system 912D. FIG. 10 shows network 914 and system 916. FIG. 10 also shows that system 916 may include tenant data storage 922, tenant data 923, system data storage 924, system data 925, User Interface (UI) 1030, Application Program Interface (API) 1032, PL/SOQL 1034, save routines 1036, application setup mechanism 1038, applications servers 10001-1000N, system process space 1002, tenant process spaces 1004, tenant management process space 1010, tenant storage area 1012, user storage 1014, and application metadata 1016. In other embodiments, environment 910 may not have the same elements as those listed above and/or may have other elements instead of, or in addition to, those listed above.

User system 912, network 914, system 916, tenant data storage 922, and system data storage 924 were discussed above in FIG. 9. Regarding user system 912, processor system 912A may be any combination of processors. Memory system 912B may be any combination of one or more memory devices, short term, and/or long term memory. Input system 912C may be any combination of input devices, such as keyboards, mice, trackballs, scanners, cameras, and/or interfaces to networks. Output system 912D may be any combination of output devices, such as monitors, printers, and/or interfaces to networks. As shown by FIG. 10, system 916 may include a network interface 920 (of FIG. 9) implemented as a set of HTTP application servers 1000, an application platform 918, tenant data storage 922, and system data storage 924. Also shown is system process space 1002, including individual tenant process spaces 1004 and a tenant management process space 1010. Each application server 1000 may be configured to tenant data storage 922 and the tenant data 923 therein, and system data storage 924 and the system data 925 therein to serve requests of user systems 912. The tenant data 923 might be divided into individual tenant storage areas 1012, which can be either a physical arrangement and/or a logical arrangement of data. Within each tenant storage area 1012, user storage 1014 and application metadata 1016 might be similarly allocated for each user. For example, a copy of a user's most recently used (MRU) items might be stored to user storage 1014. Similarly, a copy of MRU items for an entire organization that is a tenant might be stored to tenant storage area 1012. A UI 1030 provides a user interface and an API 1032 provides an application programmer interface to system 916 resident processes to users and/or developers at user systems 912. The tenant data and the system data may be stored in various databases, such as Oracle™ databases.

Application platform 918 includes an application setup mechanism 1038 that supports application developers' creation and management of applications, which may be saved as metadata into tenant data storage 922 by save routines 1036 for execution by subscribers as tenant process spaces 1004 managed by tenant management process 1010 for example. Invocations to such applications may be coded using PL/SOQL 34 that provides a programming language style interface extension to API 1032. A detailed description of some PL/SOQL language embodiments is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 4007, which is hereby incorporated by reference in its entirety and for all purposes. Invocations to applications may be detected by system processes, which manage retrieving application metadata 1016 for the subscriber making the invocation and executing the metadata as an application in a virtual machine.

Each application server 1000 may be communicably coupled to database systems, e.g., having access to system data 925 and tenant data 923, via a different network connection. For example, one application server 10001 might be coupled via the network 914 (e.g., the Internet), another application server 1000N-1 might be coupled via a direct network link, and another application server 1000N might be coupled by yet a different network connection. Transfer Control Protocol and Internet Protocol (TCP/IP) are typical protocols for communicating between application servers 1000 and the database system. However, other transport protocols may be used to optimize the system depending on the network interconnect used.

In certain embodiments, each application server 1000 is configured to handle requests for any user associated with any organization that is a tenant. Because it is desirable to be able to add and remove application servers from the server pool at any time for any reason, there is preferably no server affinity for a user and/or organization to a specific application server 1000. In some embodiments, therefore, an interface system implementing a load balancing function (e.g., an F5 Big-IP load balancer) is communicably coupled between the application servers 1000 and the user systems 912 to distribute requests to the application servers 1000. In some embodiments, the load balancer uses a least connections algorithm to route user requests to the application servers 1000. Other examples of load balancing algorithms, such as round robin and observed response time, also can be used. For example, in certain embodiments, three consecutive requests from the same user could hit three different application servers 1000, and three requests from different users could hit the same application server 1000. In this manner, system 916 is multi-tenant, wherein system 916 handles storage of, and access to, different objects, data and applications across disparate users and organizations.

As an example of storage, one tenant might be a company that employs a sales force where each call center agent uses system 916 to manage their sales process. Thus, a user might maintain contact data, leads data, customer follow-up data, performance data, goals and progress data, etc., all applicable to that user's personal sales process (e.g., in tenant data storage 922). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a call center agent is visiting a customer and the customer has Internet access in their lobby, the call center agent can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 916 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 916 might also maintain system level data usable by multiple tenants or other data. Such system level data might include industry reports, news, postings, and the like that are sharable among tenants.

In certain embodiments, user systems 912 (which may be client machines/systems) communicate with application servers 1000 to request and update system-level and tenant-level data from system 916 that may require sending one or more queries to tenant data storage 922 and/or system data storage 924. System 916 (e.g., an application server 1000 in system 916) automatically generates one or more SQL statements (e.g., SQL queries) that are designed to access the desired information. System data storage 924 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some embodiments. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for account, contact, lead, and opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, titled CUSTOM ENTITIES AND FIELDS IN A MULTI-TENANT DATABASE SYSTEM, by Weissman, et al., and which is hereby incorporated by reference in its entirety and for all purposes, teaches systems and methods for creating custom objects as well as customizing standard objects in a multi-tenant database system. In some embodiments, for example, all custom entity data rows are stored in a single multi-tenant physical table, which may contain multiple logical tables per organization. In some embodiments, multiple "tables" for a single customer may actually be stored in one large table and/or in the same table as the data of other customers.

These and other aspects of the disclosure may be implemented by various types of hardware, software, firmware, etc. For example, some features of the disclosure may be implemented, at least in part, by machine-program product that include program instructions, state information, etc., for performing various operations described herein. Examples of program instructions include both machine code, such as produced by a compiler, and files containing higher-level code that may be executed by the computer using an interpreter. Examples of machine-program product include, but are not limited to, magnetic media such as hard disks, floppy disks, and magnetic tape; optical media such as CD-ROM disks; magneto-optical media; and hardware devices that are specially configured to store and perform program instructions, such as read-only memory devices ("ROM") and random access memory ("RAM").

Any of the above embodiments may be used alone or together with one another in any combination. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

While various embodiments have been described herein, it should be understood that they have been presented by way of example only, and not limitation. Thus, the breadth and scope of the present application should not be limited by any of the embodiments described herein, but should be defined only in accordance with the following and later-submitted claims and their equivalents.

What is claimed is:

1. A method comprising:
   receiving, by a database system, an identification of a plurality of potential data transmission paths between a source node, one or more intermediary nodes, and a destination node during a communication session in a computer network using a route determination operation prior to transmitting a data packet to the destination node;
   determining, by the database system, whether at least one of identified data transmission paths is one of a plurality of trusted data transmission paths stored in a trusted data transmission path table prior to transmitting the data packet to the destination node by comparing the identified data transmission paths to the plurality of trusted data transmission paths in the trusted data transmission path table including adding one or more of the identified data transmission paths to the trusted data transmission path table if the intermediary nodes of the one or more identified data transmission paths are part of at least one of the plurality of trusted data transmission paths stored in the trusted data transmission path table; and
   generating, by the database system, a notification based on a determination that the at least one of the identified data transmission paths is not one of the plurality of trusted data transmission paths in the trusted data transmission path table prior to transmitting the data packet from the source node to the destination node, the notification comprising one of: (i) an instruction to terminate the communication session, (ii) a list comprising at least one of the plurality of trusted data transmission paths and an instruction to transmit data using the at least one of the plurality of trusted paths in the list, and (iii) an instruction to alert a user that the at least one data transmission path is not trusted.

2. The method of claim 1, further comprising comparing, by the database system, the one or more intermediary nodes of the at least one identified data transmission path with intermediary nodes associated with the plurality of trusted data transmission paths in the trusted data transmission path table.

3. The method of claim 1, wherein the identification of the at least one data transmission path is received when the communication session is initiated and the at least one identified data transmission path is stored in the trusted data transmission path table as one of the plurality of trusted data transmission paths.

4. The method of claim 3, further comprising:
   receiving, by the database system, an identification of at least a second data transmission path between the source node and the destination node in the computer network during the communication session;
   determining, by the database system, whether the second data transmission path is one of the plurality of trusted data transmission paths stored in the trusted data transmission path table, the determination being based on a comparison of the identified second data transmission path to each of the plurality of trusted data transmission paths stored in the trusted data transmission path table; and
   assigning, by the database system, a trust level to the second data transmission path in response to a determination that the second data transmission path is not one of the plurality of trusted data transmission paths stored in the trusted data transmission path table; and
   storing, by the database system, the second data transmission path, based upon its trust level, as a data transmission path in a log of untrusted data transmission paths.

5. The method of claim 4, further comprising:
   receiving, by the database system, an identification of at least a third data transmission path between the source node and the destination node in the computer network during the communication session;

determining, by the database system, whether the third data transmission path is one of the plurality of trusted data transmission paths stored in the trusted data transmission path table, the determination being based on a comparison of the identified third data transmission path to each of the plurality of trusted data transmission paths stored in the trusted data transmission path table;

determining, by the database system, whether the third data transmission path is one of the plurality of trusted data transmission paths stored in the untrusted data transmission path log in response to a determination that the identified third data transmission path is not one of the plurality of trusted data transmission paths stored in the trusted data transmission path table;

assigning, by the database system, an increased trust level to the third data transmission path in response to a determination that the third data transmission path is one of the data transmission paths stored in the untrusted data transmission path log; and storing, by the database system, the third data transmission path in the untrusted data transmission path log in a position based upon its trust level.

6. The method of claim 5, wherein the assigned trust level for the third data transmission path increases each time the third data transmission path between the source node and the destination node is received by the database system.

7. The method of claim 6, further comprising storing, by the database system, the third data transmission path in the trusted data transmission path table when the trust level associated with the third data transmission path is greater than a threshold value.

8. The method of claim 1, further comprising:
assigning, by the database system, an initial trust level value to the at least one identified data transmission path in response to the determination that the at least one of the identified data transmission path is not one of the plurality of trusted data transmission paths stored in the trusted data transmission path table, the initial trust level value identifying the at least one identified data transmission path as untrustworthy; and assigning, by the database system, a subsequent trust level value to the at least one identified data transmission path in response to each identification of the at least one identified data transmission path as a potential data transmission path during one or more subsequent route determination operations, the subsequent trust level value progressively increasing for each identification of the at least one identified data transmission path as the potential data transmission path and at least one of the subsequent trust level values identifying the at least one identified data transmission path as trustworthy.

9. An apparatus comprising:
one or more processors; and
a non-transitory computer readable medium storing a plurality of instructions, which when executed, cause the one or more processors to:
receive an identification a plurality of potential data transmission paths between a source node, one or more intermediary nodes, and a destination node during a communication session in a computer network using a route determination operation prior to transmitting a data packet to the destination node;
determine whether at least one of the identified data transmission paths is one of a plurality of trusted data transmission paths stored in a trusted data transmission path table prior to transmitting the data packet to the destination node by comparing the identified data transmission paths to the plurality of trusted data transmission paths in the trusted data transmission path table including adding one or more of the identified data transmission paths to the trusted data transmission path table if the intermediary nodes of the one or more identified data transmission paths are part of at least one of the plurality of trusted data transmission paths stored in the trusted data transmission path table; and
generate a notification based on a determination that the at least one of the identified data transmission paths is not one of the plurality of trusted data transmission paths in the trusted data transmission path table prior to transmitting the data packet from the source node to the destination node, the notification comprising one of: (i) an instruction to terminate the communication session, (ii) a list comprising at least one of the plurality of trusted data transmission paths and an instruction to transmit data using the at least one of the plurality of trusted paths in the list, and (iii) an instruction to alert a user that the at least one data transmission path is not trusted.

10. The apparatus of claim 9, wherein the plurality of instructions, when executed, further cause the one or more processors to compare the one or more intermediary nodes of the at least one identified data transmission path with intermediary nodes associated with the plurality of trusted data transmission paths in the trusted data transmission path table.

11. The apparatus of claim 9, wherein the identification of the at least one data transmission path is received when the communication session is initiated and the at least one identified data transmission path is stored in the trusted data transmission path table as one of the plurality of trusted data transmission paths.

12. The apparatus of claim 11, wherein the plurality of instructions, when executed, further cause the one or more processors to:
receive an identification of at least a second data transmission path between the source node and the destination node in the computer network during the communication session;
determine whether the second data transmission path is one of the plurality of trusted data transmission paths stored in the trusted data transmission path table, the determination being based on a comparison of the identified second data transmission path to each of the plurality of trusted data transmission paths stored in the trusted data transmission path table; and
assign a trust level to the second data transmission path in response to a determination that the second data transmission path is not one of the plurality of trusted data transmission paths stored in the trusted data transmission path table; and
store the second data transmission path, based upon its trust level, as a data transmission path in a log of untrusted data transmission paths.

13. The apparatus of claim 12, wherein the plurality of instructions, when executed, further cause the one or more processors to:
receive an identification of at least a third data transmission path between the source node and the destination node in the computer network during the communication session;
determine whether the third data transmission path is one of the plurality of trusted data transmission paths stored in the trusted data transmission path table, the determination being based on a comparison of the identified third data transmission path to each of the plurality of trusted data transmission paths stored in the trusted data transmission path table;

determine whether the third data transmission path is one of the plurality of trusted data transmission paths stored in the untrusted data transmission path log in response to a determination that the identified third data transmission path is not one of the plurality of trusted data transmission paths stored in the trusted data transmission path table;

assign an increased trust level to the third data transmission path in response to a determination that the third data transmission path is one of the data transmission paths stored in the untrusted data transmission path log; and store the third data transmission path in the untrusted data transmission path log in a position based upon its trust level.

14. The apparatus of claim 13, wherein the assigned trust level for the third data transmission path increases each time the third data transmission path between the source node and the destination node is received by the database system.

15. The apparatus of claim 14, wherein the plurality of instructions, when executed, further cause the one or more processors to store the third data transmission path in the trusted data transmission path table when the trust level associated with the third data transmission path is greater than a threshold value.

16. A computer program product comprising a non-transitory computer-readable medium having computer readable program code embodied therein to be executed by one or more processors when retrieved from the non-transitory computer-readable medium, the program code including instructions to:

receive an identification a plurality of potential data transmission paths between a source node, one or more intermediary nodes, and a destination node during a communication session in a computer network using a route determination operation prior to transmitting a data packet to the destination node;

determine whether at least one of the identified data transmission paths is one of a plurality of trusted data transmission paths stored in a trusted data transmission path table prior to transmitting the data packet to the destination node by comparing the identified data transmission paths to the plurality of trusted data transmission paths in the trusted data transmission path table including adding one or more of the identified data transmission paths to the trusted data transmission path table if the intermediary nodes of the one or more identified data transmission paths are part of at least one of the plurality of trusted data transmission paths stored in the trusted data transmission path table; and generate a notification based on a determination that the at least one of the identified data transmission paths is not one of the plurality of trusted data transmission paths in the trusted data transmission path table prior to transmitting the data packet from the source node to the destination node, the notification comprising one of: (i) an instruction to terminate the communication session, (ii) a list comprising at least one of the plurality of trusted data transmission paths and an instruction to transmit data using the at least one of the plurality of trusted paths in the list, and (iii) an instruction to alert a user that the at least one data transmission path is not trusted.

17. The computer program product of claim 16, wherein the program code includes further instructions to compare the one or more intermediary nodes of the at least one identified path with intermediary nodes associated with the plurality of trusted paths.

18. The computer program product of claim 16, wherein the identification of the at least one data transmission path is received when the communication session is initiated and the at least one identified data transmission path is stored in the trusted data transmission path table as one of the plurality of trusted data transmission paths.

19. The computer program product of claim 18, wherein the program code includes further instructions to:

receive an identification of at least a second data transmission path between the source node and the destination node in the computer network during the communication session;

determine whether the second data transmission path is one of the plurality of trusted data transmission paths stored in the trusted data transmission path table, the determination being based on a comparison of the identified second data transmission path to each of the plurality of trusted data transmission paths stored in the trusted data transmission path table; and assign a trust level to the second data transmission path in response to a determination that the second data transmission path is not one of the plurality of trusted data transmission paths stored in the trusted data transmission path table; and store the second data transmission path, based upon its trust level, as a data transmission path in a log of untrusted data transmission paths.

20. The computer program product of claim 19, wherein the program code includes further instructions to:

receive an identification of at least a third data transmission path between the source node and the destination node in the computer network during the communication session;

determine whether the third data transmission path is one of the plurality of trusted data transmission paths stored in the trusted data transmission path table, the determination being based on a comparison of the identified third data transmission path to each of the plurality of trusted data transmission paths stored in the trusted data transmission path table;

determine whether the third data transmission path is one of the plurality of trusted data transmission paths stored in the untrusted data transmission path log in response to a determination that the identified third data transmission path is not one of the plurality of trusted data transmission paths stored in the trusted data transmission path table;

assign an increased trust level to the third data transmission path in response to a determination that the third data transmission path is one of the data transmission paths stored in the untrusted data transmission path log; and store the third data transmission path in the untrusted data transmission path log in a position based upon its trust level.

21. The computer program product of claim 20, wherein the assigned trust level for the third data transmission path increases each time the third data transmission path between the source node and the destination node is received by the database system.

22. The computer program product of claim 21, wherein the plurality of instructions, when executed, further cause the one or more processors to store the third data transmission path in the trusted data transmission path table when the trust level associated with the third data transmission path is greater than a threshold value.

\* \* \* \* \*